United States Patent
Keegan et al.

(10) Patent No.: US 8,837,654 B2
(45) Date of Patent: Sep. 16, 2014

(54) SIGNAL RECEIVER WITH GROUP DELAY AND AMPLITUDE DISTORTION COMPENSATION

(71) Applicant: Deere & Company, Moline, IL (US)

(72) Inventors: Richard G. Keegan, Palos Verdes Estates, CA (US); Jerry E. Knight, Long Beach, CA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/892,210

(22) Filed: May 10, 2013

(65) Prior Publication Data

US 2013/0329835 A1 Dec. 12, 2013

Related U.S. Application Data

(60) Provisional application No. 61/657,654, filed on Jun. 8, 2012.

(51) Int. Cl.
*H04B 1/10* (2006.01)
*H04B 1/12* (2006.01)

(52) U.S. Cl.
CPC ..................................... *H04B 1/123* (2013.01)
USPC ........................................................ 375/350

(58) Field of Classification Search
CPC .... H04B 1/123; H04L 25/061; H04L 7/0054; H04L 27/364
USPC .......................................... 375/232–236, 350
See application file for complete search history.

(56) References Cited

U.S. PATENT DOCUMENTS

| 6,233,276 | B1 | | 5/2001 | Simeon | |
|---|---|---|---|---|---|
| 7,646,830 | B1 | * | 1/2010 | Weill | 375/341 |
| 8,294,605 | B1 | * | 10/2012 | Pagnanelli | 341/144 |
| 2002/0168951 | A1 | * | 11/2002 | Paulus et al. | 455/130 |
| 2003/0231723 | A1 | * | 12/2003 | Hansen | 375/343 |
| 2005/0159120 | A1 | * | 7/2005 | Garg et al. | 455/132 |
| 2006/0001559 | A1 | * | 1/2006 | Tuttle et al. | 341/120 |
| 2006/0133546 | A1 | | 6/2006 | Demir et al. | |
| 2006/0262872 | A1 | * | 11/2006 | Green et al. | 375/260 |
| 2009/0141828 | A1 | * | 6/2009 | Huang et al. | 375/296 |

(Continued)

FOREIGN PATENT DOCUMENTS

| EP | 1434401 A1 | 6/2004 |
|---|---|---|
| EP | 2086194 A2 | 8/2009 |
| WO | WO 99/60701 A1 | 11/1999 |

OTHER PUBLICATIONS

Deere & Company, ISR-WO PCT/US2013/044534, Aug. 15, 2013, 10 pgs.

(Continued)

*Primary Examiner* — Don N Vo
(74) *Attorney, Agent, or Firm* — Morgan, Lewis & Bockius LLP

(57) ABSTRACT

A signal receiver includes an antenna interface for receiving signals from an antenna, analog signal processing circuitry coupled to the antenna interface for processing the received signals to produce filtered signals, sampling circuitry to sample the filtered signals so as to produce digitized received signals, a digital compensator to receive the digitized received signals and compensate for non-uniform group delay and amplitude distortion introduced by the analog signal processing circuitry to produce compensated digitized received signals, and a digital processor to process the compensated digitized received signals so as to produce a result.

24 Claims, 13 Drawing Sheets

(56) References Cited

U.S. PATENT DOCUMENTS

| | | |
|---|---|---|
| 2009/0219201 A1 | 9/2009 | Martin et al. |
| 2010/0151806 A1* | 6/2010 | Firoiu et al. ............... 455/192.2 |
| 2011/0274215 A1* | 11/2011 | Hollis ........................... 375/317 |
| 2011/0280570 A1 | 11/2011 | Xia et al. |
| 2014/0062782 A1* | 3/2014 | Abraham ................. 342/357.73 |

OTHER PUBLICATIONS

Deere & Company, International Search Report, PCT/US2013/044541, Sep. 24, 2013, 11 pgs.

* cited by examiner

SIGNAL RECEIVER WITH GROUP DELAY AND AMPLITUDE DISTORTION COMPENSATION

RELATED APPLICATIONS

This application claims priority to U.S. Provisional Patent Application No. 61/657,654, filed Jun. 8, 2012, which is hereby incorporated by reference in its entirety.

TECHNICAL FIELD

The disclosed embodiments relate generally to the field of signal processing at signal receivers, and in particular to a system and method for compensating for group delay distortions and, optionally, amplitude distortions at a signal receiver.

BACKGROUND

Signal receivers often include apparatus and circuitry (such as, analog signal processing circuitry) to condition received signals to have desired amplitude, phase and/or frequency characteristics. The apparatus and circuitry at the signal receivers may also be designed to eliminate or reduce the effects of interfering noise and other distortions introduced into the signals along the signal propagation path, prior to being received at the signal receivers.

SUMMARY

In the process of conditioning the received signals, the apparatus and circuitry (such as, the analog signal processing circuitry) at the signal receivers may introduce additional signal distortions or undesired characteristics to the received signals.

One form of signal distortion that may be introduced by the apparatus and circuitry at the signal receivers is phase distortion (sometimes herein called group-delay distortion). Phase distortions introduced by the components of the signal receiver result from a non-linear phase response of the respective components of the signal receiver. Phase distortions are observed as non-linear phase vs. frequency characteristics, or a non-uniform group delay over the frequency pass band of interest. Phase distortions limit the ability of the signal receiver to combine information from signals having different frequencies, thereby limiting the accuracy of measurements derived from wideband signals obtained from combining multiple signals or multi-frequency signals.

Another form of signal distortion potentially introduced by the apparatus and circuitry at the signal receivers is amplitude distortion. Amplitude distortions introduced by the components of the signal receiver result from a non-symmetric magnitude response of the respective components of the signal receiver. Amplitude distortions are observed as non-symmetric magnitude vs. frequency characteristics over the frequency pass band of interest.

Some embodiments provide a signal receiver that includes an antenna interface for receiving signals from an antenna, analog signal processing circuitry coupled to the antenna interface for processing the received signals to produce filtered signals, sampling circuitry to sample the filtered signals so as to produce digitized received signals, a compensation mechanism to receive the digitized received signals and compensate for non-uniform group delay and amplitude distortion introduced by the analog signal processing circuitry to produce compensated digitized received signals, and a digital processor to process the compensated digitized received signals so as to produce a result.

Some embodiments provide a method of signal compensation performed at a signal receiver. The method includes configuring a compensation mechanism at the signal receiver in accordance with processed digital signals received by the compensation mechanism in response to injection of a calibration signal at the signal receiver by a calibration signal generator, the configuring including configuring the compensation mechanism to compensate for non-uniform group delay and amplitude distortion introduced by analog signal processing circuitry of the signal receiver. The method further includes receiving signals at the signal receiver, processing the received signals at the signal receiver to produce digitized received signals, and compensating the digitized received signals using the compensation mechanism to produce compensated signals.

Some embodiments provide a method of signal compensation performed at a signal receiver. The method includes receiving signals from an antenna; processing the received signals with analog signal processing circuitry to produce filtered signals; sampling the filtered signals with sampling circuitry to produce digitized received signals; compensating the digitized received signals, with a compensation mechanism, for non-uniform group delay and amplitude distortion introduced by the analog signal processing circuitry to produce compensated digitized received signals; and processing the compensated digitized received signals so as to produce a result.

In some of the aforementioned embodiments, the compensation mechanism is configured by injecting a calibration signal at the signal receiver; transforming digital signals, corresponding to the injected calibration signal, received by the compensation mechanism from time-domain to frequency-domain to produce a complex-valued frequency-domain representation of the processed digital signals; and extracting magnitude and phase values from the complex-valued frequency-domain representation of the processed digital signals. Configuring the compensation mechanism further includes computing phase residuals by subtracting the extracted phase values from target frequency-dependent phase information, computing magnitude response residuals by determining ratios of the extracted magnitude values with target magnitude response information, generating a set of complex values from the computed phase residuals and magnitude response residuals, and transforming the set of complex values from frequency-domain to time-domain to produce complex-valued time-domain filter coefficients corresponding to a finite impulse response filter.

BRIEF DESCRIPTION OF THE DRAWINGS

Like reference numerals refer to corresponding parts throughout the drawings.

DESCRIPTION OF EMBODIMENTS

It will be understood that although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various embodiments, examples of which are illustrated in the accompanying drawings. In the following detailed description, numerous specific details are set forth in order to provide a thorough understanding of the described embodiments. However, various embodiments may be practiced without these specific details. In other instances, well-known methods, procedures, components, and circuits have not been described in detail so as not to unnecessarily obscure aspects of the embodiments.

Figure 1:
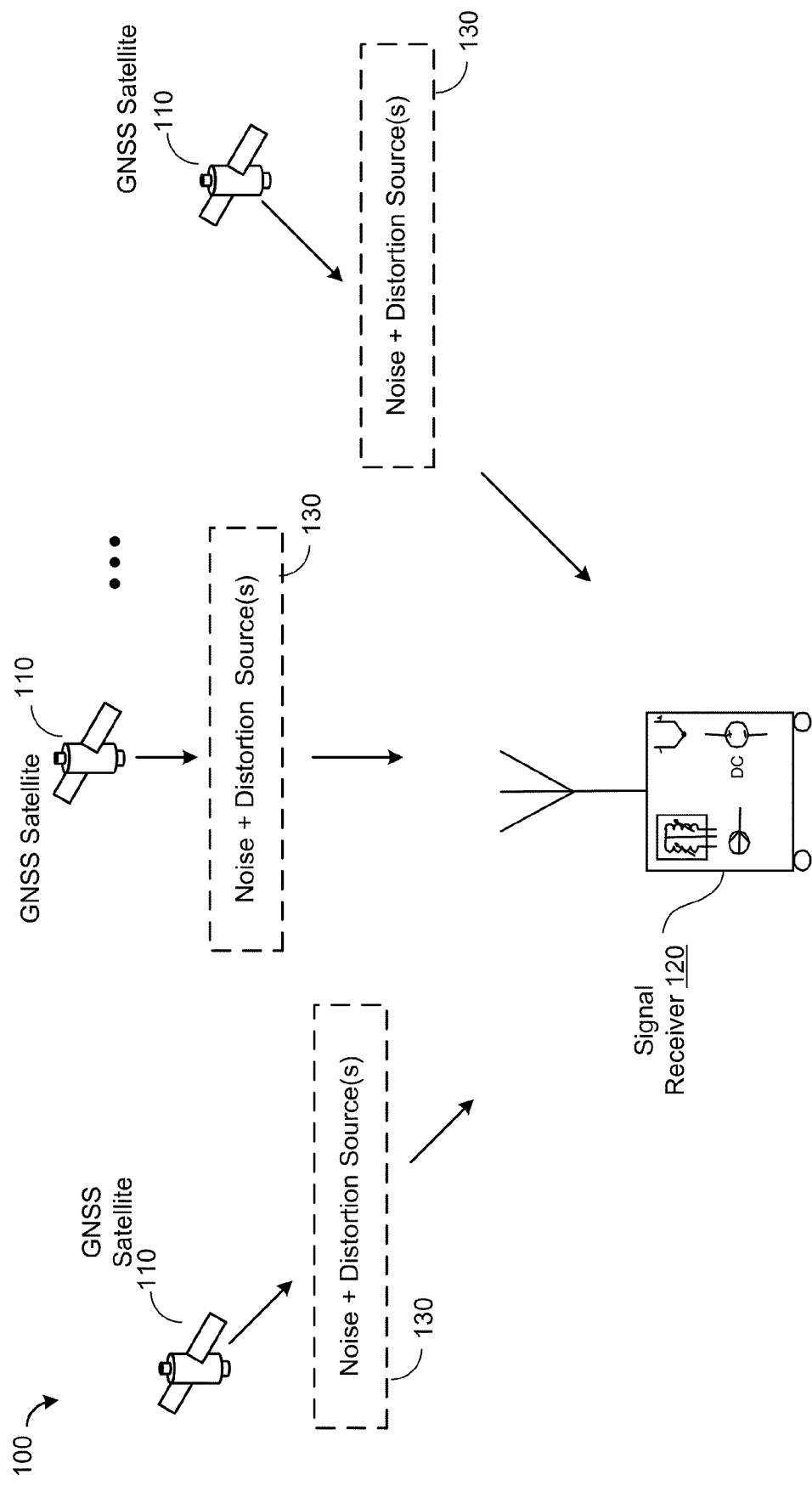
FIG. 1 illustrates an example application (a GNSS satellite navigation system) for a signal receiver with group delay compensation, in accordance with some embodiments.

FIG. 1 includes a block diagram illustrating an example of a system (e.g., a Global Navigation Satellite System (GNSS) 100) that comprises a signal receiver (such as, Signal Receiver 120) with group delay and amplitude compensation, according to some embodiments.

GNSS 100 comprises one or more GNSS satellite(s) 110 and Signal Receiver 120. GNSS satellite(s) 110 transmits signals (e.g., signals containing navigation information) to be received by Signal Receiver 120. The signals transmitted by GNSS satellite(s) 110 travel through various propagation media (e.g., layers of the atmosphere) prior to reaching Signal Receiver 120.

The propagation media include undesired Noise and Distortion Source(s) 130 which introduce noise and/or distortions into the transmitted signals, causing the signals transmitted by GNSS satellite(s) 110 to be impacted detrimentally. Some detrimental effects of noise and distortions introduced by Noise and Distortion Source(s) 130 include degradation of signal to noise ratio (e.g., by the introduction of undesired noise power with frequency content outside—and often within—the frequency bands of interest), and undesirable and often non-uniform, non-deterministic changes to the amplitude, frequency and phase content of the transmitted signals.

Signal Receiver 120 typically includes analog and digital circuitry to at least partially mitigate or counteract the detrimental effects of Noise and Distortion Source(s) 130 on the received signal.

Further, Signal Receiver 120 includes signal conditioning elements (e.g., filters and amplifiers) in the analog signal processing circuitry that selectively emphasize signals having frequencies of interest, and reject or attenuate signals that do not have frequencies within the bandwidth of interest.

Figure 2:
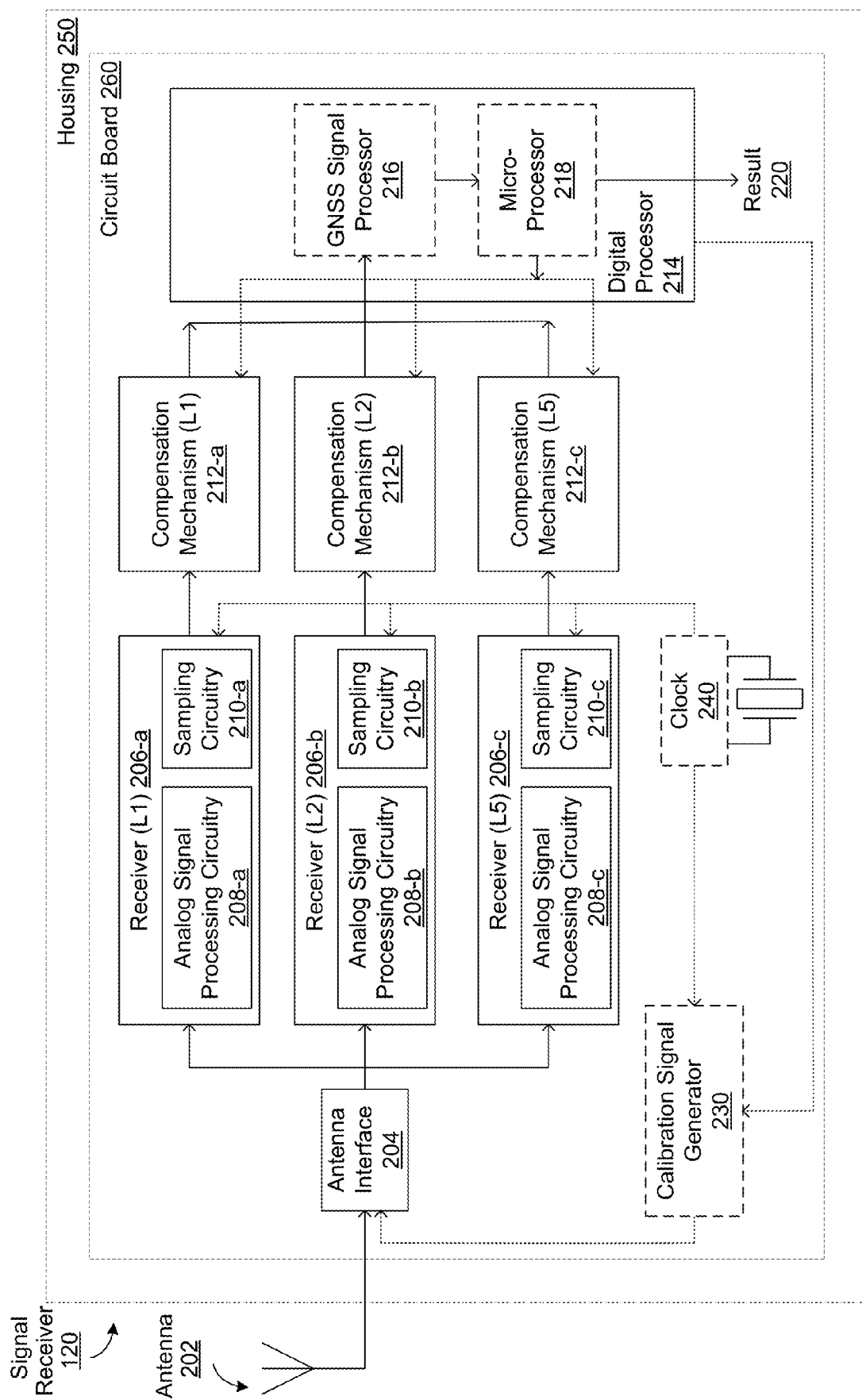
FIG. 2 is a block diagram illustrating a signal receiver with group delay compensation, in accordance with some embodiments.

FIG. 2 is a block diagram illustrating a Signal Receiver 120 in accordance with some embodiments. In some embodiments, Signal Receiver 120 receives signals from Antenna 202. Signal Receiver 120 includes Antenna Interface 204, Receiver(s) 206 and Compensation Mechanism(s) 212 (also herein called digital compensator(s)) for every frequency band of interest, and Digital Processor 214. Signal Receiver 120 also optionally includes Calibration Signal Generator 230, Clock 240, Housing 250, and Circuit Board 260.

Antenna Interface 204 receives signals from an antenna (e.g., Antenna 202) and optionally from a calibration signal generator (e.g., Calibration Signal Generator 230).

Receiver(s) 206 includes Analog Signal Processing Circuitry 208 and Sampling Circuitry 210. Analog Signal Processing Circuitry 208 is coupled to Antenna Interface 204 for processing the received signals to produce filtered signals. In some embodiments, Analog Signal Processing Circuitry 208 includes various frequency, amplitude and phase conditioning components, such as, one or more analog filters and/or one or more gain (amplification) stages. In some embodiments, Analog Signal Processing Circuitry 208 corresponds to or includes a low noise amplifier. In some implementations, Analog Signal Processing Circuitry 208 includes a (quadrature) demodulator to down-convert the received signals to produce orthogonal baseband signals (for example, orthogonal I and Q signal components). Sampling Circuitry 210 samples the filtered signals from Analog Signal Processing Circuitry 208 so as to produce digitized received signals. In some embodiments, circuitry for producing the digitized received signals further includes quantization circuitry and digitization circuitry. It may be noted that in some implementations, Signal Receiver 120 includes separate Receivers 206 (and consequently, separate Analog Signal Processing Circuitry 208 and Sampling Circuitry 210) for two or more frequency bands of interest. Optionally, Signal Receiver 120 includes separate Receivers 206 for every frequency band of interest. As shown in the example in FIG. 2, Receivers 206-$a$ (and consequently, Analog Signal Processing Circuitry 208-$a$ and Sampling Circuitry 210-$a$) is configured to operate at the L1 frequency band (e.g., 1575.42±16 MHz; or 1559 MHz-1591 MHz), Receiver 206-$b$ (and consequently, Analog Signal Processing Circuitry 208-$b$ and Sampling Circuitry 210-$b$) is configured to operate at the L2 frequency band (e.g., 1227.6±16 MHz; or 1211 MHz-1243 MHz), and Receiver 206-c (and consequently, Analog Signal Processing Circuitry 208-c and Sampling Circuitry 210-c) is configured to operate at the L5 frequency band (e.g., 1176.45±16 MHz; or 1160 MHz-1192 MHz).

Compensation Mechanism(s) 212 receives the digitized received signals and compensates for non-uniform group delay and, in some implementations, amplitude distortion introduced by the analog signal processing circuitry 208 to produce compensated digitized received signals. In some embodiments, the compensation mechanism (e.g., Compensation Mechanism 212) compensates for signal distortions in the digitized received signals produced by the analog signal processing circuitry in one or more predefined ranges of frequencies. In some embodiments, the signal distortions are phase distortions introduced by the non-linear phase response of Analog Signal Processing Circuitry 208. The non-linear phase response of Analog Signal Processing Circuitry 208 causes undesirable variations in group delay when processing signals that span a desired range of frequencies. In some embodiments, the signal distortions include amplitude distortions introduced by a non-symmetric magnitude response of Analog Signal Processing Circuitry 208. The non-symmetric magnitude response of Analog Signal Processing Circuitry 208 causes undesirable effects on signals that span a desired range of frequencies.

In some implementations, Compensation Mechanism(s) 212 is implemented in a digital signal processor, sometimes called a DSP. In some other implementations, Compensation Mechanism(s) 212 is implemented in circuitry, such as an FIR filter and one or more registers. Alternatively, or in addition, Compensation Mechanism(s) 212 is implemented in software executed by a general purpose processor. It may be noted that the term "non-uniform," as used herein, indicates having different delays for different frequencies in a predefined range of frequencies. In some implementations, Signal Receiver 120 is configured to include a separate Compensation Mechanism 212 for every frequency band of interest. As shown in the example in FIG. 2, Compensation Mechanism 212-a is configured to operate at the L1 frequency band (e.g., a frequency band that includes 1559 MHz-1591 MHz), Compensation Mechanism 212-b is configured to operate at the L2 frequency band (e.g., a frequency band that includes 1211 MHz-1243 MHz), and Compensation Mechanism 212-c is configured to operate at the L5 frequency band (e.g., a frequency band that includes 1160 MHz-1192 MHz).

It should be understood that the frequency bands and frequency bandwidth described (such as L1, L2, and L5 frequency bands, and corresponding bandwidth) are merely illustrative and representative; the signal receiver and methods performed by the signal receiver described herein can be configured to operate at frequency bands or frequencies not specifically listed here.

Digital Processor 214 processes compensated digitized received signals so as to produce a Result 220. In some implementations, the result (e.g., Result 220) includes a range to satellite, ranges to multiple satellites, navigation result(s), geographical location(s), and/or satellite time value(s). In some embodiments, Digital Processor 214 is implemented using one or more microprocessors or other programmable processors. Digital Processor 214 is further described herein with reference to FIG. 3F. In some implementations, Digital Processor 214 is implemented within or close to the baseband system; as such, Digital Processor 214 is configured to operate on baseband signals. In some embodiments, Digital Processor 214 optionally includes GNSS Processor 216 and Microprocessor 218. GNSS Processor 216 typically includes circuitry, such as correlators, for analyzing signals received from GNSS satellites and thereby assisting Microprocessor 218 to perform navigation functions and optionally other functions. Digital Processor 214 includes and executes control instructions for controlling when Calibration Signal Generator 230, described below, injects a calibration signal at Antenna Interface 204 and for controlling configuration of Compensation Mechanism 212 (for example, through control signals provided by Microprocessor 218) in accordance with digitized received signals received in response to the injection of the calibration signal at Antenna Interface 204.

In some embodiments, Calibration Signal Generator 230 is coupled to Antenna Interface 204, to inject a calibration signal at Antenna Interface 204.

In some embodiments, Clock 240 provides synchronized clock timing signals to Calibration Signal Generator 230 and Sampling Circuitry 210.

In some embodiments, Antenna Interface 204, Analog Signal Processing Circuitry 208, Sampling Circuitry 210, Compensation Mechanism 212, Digital Processor 214 and Calibration Signal Generator 230 are all contained within Housing 250.

In some embodiments, Antenna Interface 204, Analog Signal Processing Circuitry 208, Sampling Circuitry 210, Compensation Mechanism 212, Digital Processor 214 and Calibration Signal Generator 230 are mounted on a single circuit board (e.g., Circuit Board 260). Alternatively, Antenna Interface 204 is not mounted on the circuit board on which the other components are mounted. Typically, in embodiments that include Housing 250, Circuit Board 260 is contained within Housing 250.

In some embodiments, the signal receiver (e.g., Signal Receiver 120) is a satellite signal receiver.

Figure 3A:
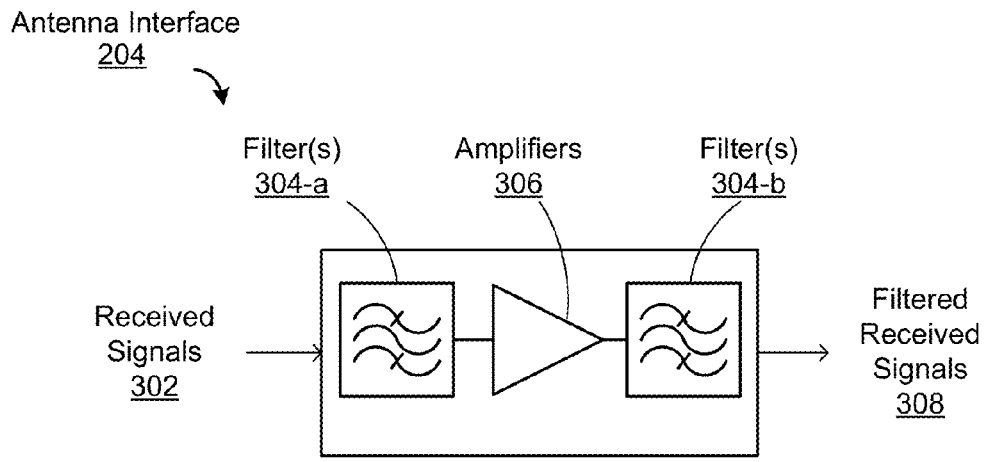
FIGS. 3A-3F include block diagrams illustrating components of a signal receiver with group delay compensation, in accordance with some embodiments.

FIG. 3A is a block diagram illustrating an Antenna Interface 204 in accordance with some embodiments. As shown in FIG. 3A, Antenna Interface 204 includes one or more filters (e.g., Filter(s) 304-a and Filter(s) 304-b) to limit the frequencies of Received Signals 302 to frequencies of interest. Filter(s) 304-a and Filter(s) 304-b include filters with fixed or variable (e.g., tunable) properties. Antenna Interface 204 also includes one or more Amplifiers 306 for amplifying or strengthening signals of interest. Amplifiers 306 may include one or more amplifiers with fixed or variable (e.g., tunable) properties.

Figure 3B:
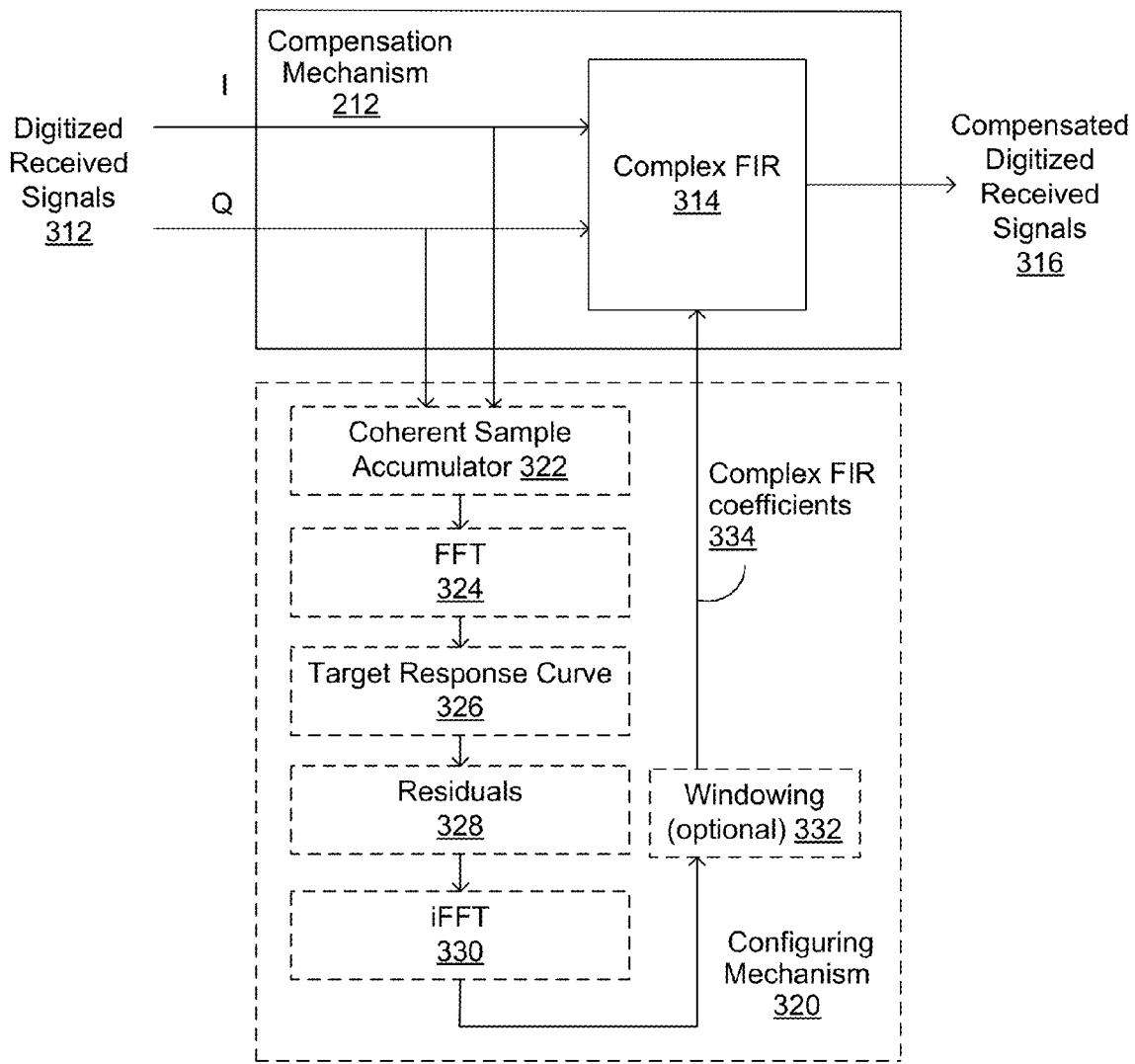

FIG. 3B is a block diagram illustrating a Compensation Mechanism 212 and an optional Configuring Mechanism 320. As explained above, Compensation Mechanism 212 receives digitized received signals (e.g., Digitized Received Signals 312) and compensates for non-uniform group delay and, in some implementations, amplitude distortion introduced by Antenna Interface 204 and Analog Signal Processing Circuitry 208 to produce compensated digitized received signals (e.g., Compensated Digitized Received Signals 316).

In some embodiments, Compensation Mechanism 212 is configured (for example, using Configuring Mechanism 320) to process Digitized Received Signals 312 using a finite impulse response filter or FIR filter (e.g., Complex FIR 314) using a set of complex filter coefficients (e.g., Complex FIR coefficients 334) to compensate for non-uniform group delay and, in some implementations, amplitude distortion introduced by at least the analog signal processing circuitry (e.g., Analog Signal Processing Circuitry 208).

In some embodiments, the compensation mechanism (e.g., Compensation Mechanism 212) is configured (e.g., by Configuring Mechanism 320) in accordance with signals received by the compensation mechanism in response to injection of the calibration signal at the antenna interface, for example by Calibration Signal Generator 230.

In some embodiments, Configuring Mechanism 320 performs a method of configuring the compensation mechanism as described with reference to FIGS. 5A-5D below.

As shown in FIG. 3B, in some implementations Configuring Mechanism 320 includes Coherent Sample Accumulator 322 (shown in more detail in FIG. 3E), which is used to store and coherently accumulate (across multiple calibration cycles) samples of the digitized received signals received in response to injection of the calibration signal, and thus outputs coherently accumulated samples. In some implementations, coherent accumulation is performed by coherently combining samples of the digitized received signals received in response to injection of the calibration signal—across multiple calibration cycles—using methods such as summing, averaging, filtering (e.g., by the use of Kalman filters or Bayesian estimators) or any combination thereof. Coherent Sample Accumulator 322 may be implemented in hardware (e.g., accumulation registers, clock dividers, etc.) or in software executed by a digital signal processor or general purpose microprocessor.

An FFT 324 (e.g., N-Point FFT 324-a, shown in FIG. 3E) performs a complex Fourier Transform on the coherently accumulated (e.g., summed or averaged) samples to produce a set of complex values for a plurality of frequency components. For example, for an N-point FFT, the output of FFT 324 is, or includes, N complex values, each having a real component and an imaginary component. FFT 324 may be implemented in software, hardware (e.g., on an FFT chip), or on a digital signal processor. In some implementations, the output of the FFT 324 is converted to produce the measured phase response (which is called the Actual Phase Response 402 in FIG. 4A) and, in some implementations, the measured magnitude response (which is called the Actual Magnitude Response 412 in FIG. 4B and Actual Magnitude Response 422 in FIG. 4C) of Antenna Interface 204 and Analog Signal Processing Circuitry 208. The measured phase response represents the measured phases of the filtered signal (e.g., the digitized received signal received in response to the injected calibration signal) at various frequencies present in the filtered signal. The measured magnitude response represents the measured magnitude of the filtered signal (e.g., the digitized received signal received in response to the injected calibration signal) at various frequencies present in the filtered signal. In some embodiments, the measured phase response (which is called the Actual Phase Response 402 in FIG. 4A) is obtained from a polynomial fit (e.g., polynomial smoothing) to the measured phases of the filtered signal (e.g., the digitized received signal received in response to the injected calibration signal) at various frequencies. In such embodiments, the measured phase response is represented (e.g., approximated) by a polynomial having a numerical order; the numerical order being selected so as to eliminate undesired noise in the polynomial representation of the measured phases of the filtered signal, while preserving (e.g., approximating) the effects of group delay distortions on the measured phases of the filtered signal. In some embodiments, the polynomial is then sampled at a plurality of frequencies (e.g., corresponding to frequency bins of N-point FFT 324-a) to produce smoothed measured phases of the filtered signal at the plurality of frequencies. In some embodiments, smoothed measured phases are generated (e.g., computed) from the phase values (e.g., Actual Phase Response 402) of corresponding frequency components of the digitized received signals using interpolation methods (e.g., curve-fitting, polynomial interpolation, spline interpolation, Gaussian interpolation, regression-based methods, etc.). In some embodiments, the measured magnitude response (which is called the Actual Magnitude Response 412 in FIG. 4B and Actual Magnitude Response 422 in FIG. 4C) is obtained from the measured magnitudes of the filtered signal at various frequencies by similar methods as those described above for obtaining the measured phase response.

Target Response Curve 326 (e.g., Target Response 404, shown in FIG. 4A and/or Target Magnitude Response 414, shown in FIG. 4B) corresponds to a desired set of frequency-dependent phase values and/or frequency-dependent magnitude values stored previously or (optionally) generated from Actual Phase Response 402 and/or Actual Magnitude Response 412, respectively. In some implementations, the target phase values (e.g., Target Response Curve 326 or Target Response 404) are generated (e.g., computed) from a straight line fit (e.g., Straight Line 404-a) to the phase values (e.g., Actual Phase Response 402) of corresponding frequency components of the digitized received signals. In some embodiments, the target phase values (e.g., Target Response Curve 326 or Target Response 404) are generated (e.g., computed) from the phase values (e.g., Actual Phase Response 402) of corresponding frequency components of the digitized received signals using interpolation methods (e.g., curve-fitting, polynomial interpolation, spline interpolation, Gaussian interpolation, regression-based methods, etc.). Alternatively, the target phase values are fixed values determined in advance, independent of the measured phase response (e.g., Actual Phase Response 402). In some embodiments, the target magnitude values are obtained from magnitude values (e.g., Actual Magnitude Response 412, shown in FIG. 2C) of corresponding frequency components of the digitized received signals by similar methods as those described above for obtaining the target phase values. Alternatively, the target magnitude values are fixed values determined in advance, independent of the measured magnitude response (e.g., Actual Magnitude Response 412).

In some embodiments, residual phase differences (e.g., Residuals 328 or Phase Residuals 406) are computed by subtracting the phase values (e.g., Actual Phase Response 402) of corresponding frequency components of the digitized received signals from the target phase values (e.g., Target Response Curve 326 or Target Response 404). In some embodiments, residual magnitude differences (e.g., Residuals 328 or Magnitude Residuals 416) are computed by determining ratios of the extracted magnitude values (e.g., Actual Magnitude Response 412) of corresponding frequency components of the digitized received signals with the target magnitude response information (e.g., Target Response Curve 326 or Target Response 404).

An inverse Fast Fourier Transform (e.g., iFFT 330) is performed on a representation of the residual phase differences (e.g., Residuals 328 or Phase Residuals 406) and, in some implementations, magnitude response residuals (e.g., Magnitude Residuals 416) to produce an initial set of complex values corresponding to FIR coefficients. It may be noted that iFFT 330 may be implemented using software executed by a digital signal processor or general purpose microprocessor, or hardware (e.g., on an FFT circuit). In some implementations, FFT 324 and iFFT 330 are implemented using the same FFT circuit, or the same program(s) executed by a digital signal processor or general purpose microprocessor.

Optionally, a windowing operation (Windowing 332) is performed on initial set of complex values obtained from iFFT 330, which conditions the results produced by iFFT 330 by reducing the magnitude of the edge components of the results of iFFT 330 by multiplying the results of iFFT 330 by a windowing function (e.g., a Tukey window, or even more specifically a Tukey 0.5 window). In some implementations, Windowing 332 is implemented using software executed by a digital signal processor or general purpose microprocessor, or hardware. "Edge components" of results of iFFT 330 are typically components not in a predefined central portion of the results. In one example, in an implementation that produces 128 complex FIR coefficients as the result of iFFT 330, sequentially numbered from 1 to 128, the center components include at least components 32 to 96, and the edge components include components 1 to 31 and 97 to 128 or a subset of components 1 to 31 and 97 to 128.

In various embodiments, any of a number of windowing functions are used to window the set of complex values obtained from iFFT 330 to produce the complex FIR coefficients, such as windowing functions described in G. Heinzel, A. Rudiger, R. Schilling, "Spectrum and spectral density estimation by the Discrete Fourier transform (DFT), including a comprehensive list of window functions and some new flat-top windows," Internal Report, Max-Planck-Institut fur Gravitationsphysik, Hannover, 2002; and F J Harris, "On the Use of Windows for Harmonic Analysis with the Discrete Fourier Transform," Proceedings of IEEE, vol. 66, pp. 51-83, 1978.

The method performed by Configuring Mechanism 320 is explained further in relation to FIGS. 5A-5D.

Figure 3C:
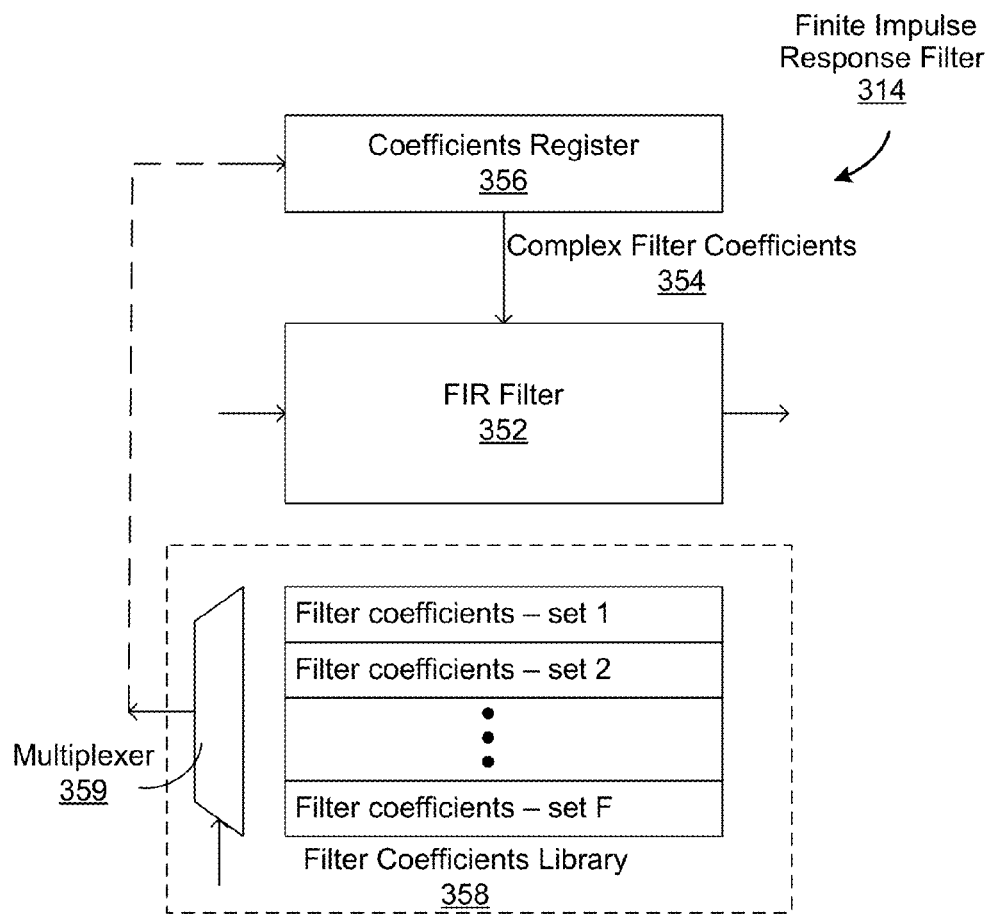

FIG. 3C is a block diagram illustrating a Finite Impulse Response Filter 314 as used in Compensation Mechanism 212. As shown in FIG. 3C, FIR Filter 352 (e.g., Complex FIR 314, shown in FIG. 3B) uses Complex Filter Coefficients 354 (e.g., Complex FIR coefficients 334, shown in FIG. 3B). In some embodiments, Complex Filter Coefficients 354 for FIR Filter 352 are stored in a Coefficients Register 356. Optionally, Coefficients Register 356 is implemented internally within FIR Filter 352. As described above, and also below with respect to FIGS. 5A-5D, in some implementations, Complex Filter Coefficients 354 are generated (e.g., by Configuring Mechanism 320) by processing calibration signals injected at antenna interface 204 during one or more calibration periods.

Alternatively, in some implementations, the filter coefficients stored in Coefficient Register 356 are obtained from Filter Coefficients Library 358. Filter Coefficients Library 358 stores multiple sets of filter coefficients as shown in FIG. 3C. A multiplexer 359 is used to select a set of filter coefficients from the Filter Coefficients Library 358, for example, based on operating conditions (e.g., temperature) in or near the signal receiver 120. In these implementations, FIR Filter 352 filters digitized received signals using the selected set of set of filter coefficients from the Filter Coefficients Library 358. In some implementations, the multiple sets of filter coefficients stored in Filter Coefficients Library 358 are filter coefficients generated at a plurality of different operating conditions (e.g., a plurality of measured temperatures). The process of generating the multiple sets of filter coefficients in Filter Coefficients Library 358 is sometimes called factory calibration, as the coefficients may be generated "at the factory" during or shortly after manufacturing the signal receiver. In some embodiments, filter coefficients generated through factory calibration are obtained using an external calibration signal (i.e., a calibration signal generated external to the receiver), and in such embodiments the signal receiver need not include Calibration Signal Generator 230.

Figure 3D:
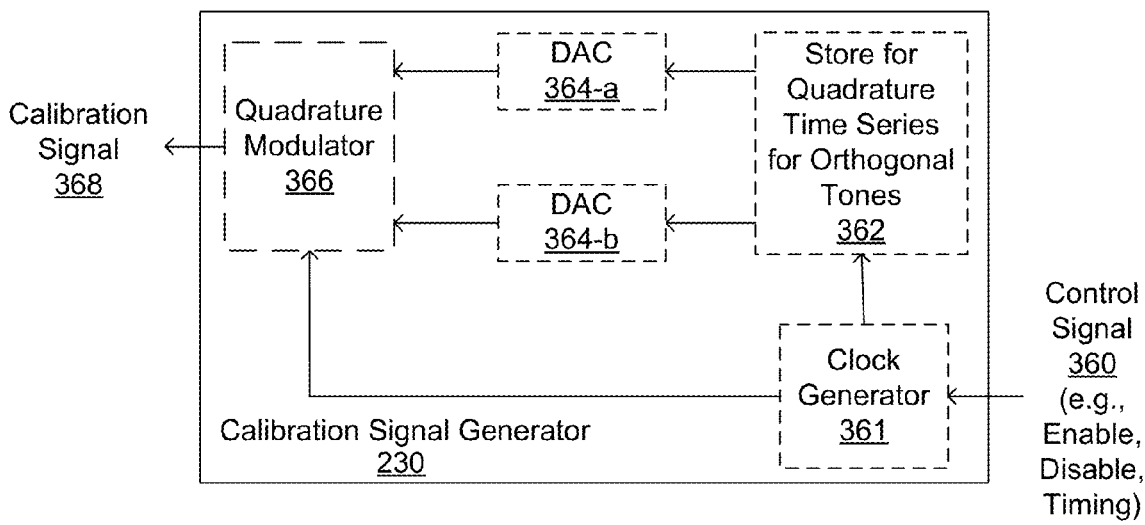

FIG. 3D is a block diagram illustrating a Calibration Signal Generator 230. As shown in FIG. 2, Calibration Signal Generator 230 is coupled to the Antenna Interface 204, to inject a calibration signal at Antenna Interface 204.

In some embodiments, the calibration signal produced by Calibration Signal Generator 230 includes a time domain signal corresponding to orthogonal frequency components in a predefined range of frequencies. In such embodiments, the duration (or period) of the time domain signal is equal to, or an integral multiple of, the inverse of the frequency spacing between the orthogonal frequency components. In some embodiments, the calibration signal includes a step carrier signal. In some embodiments, the calibration signal includes a swept carrier signal. In some embodiments, the calibration signal includes evenly spaced frequency components, such as frequency components from X1 MHz to X2 MHz in Y MHz increments (e.g., 1 MHz increments), where X1 and X2 MHz correspond to the frequency span or bandwidth of the received signal (received at Antenna Interface 204), sometimes called the passband of interest, and Y MHz defines the (typically uniform) spacing (i.e., frequency interval) between consecutive frequency components. In such embodiments, some implementations provide a duration (or period) of the calibration signal equal to, or an integral multiple of, the inverse of the frequency interval (i.e., spacing—e.g., Y MHz) between the consecutive frequency components.

In the example implementation shown in FIG. 3D, the calibration signal is a multi-tone (sometimes called a multi-carrier) Calibration Signal 368 that is an OFDM (Orthogonal Frequency-Division Multiplex) signal, or is similar to an OFDM signal except that no data is generated or conveyed by the Calibration Signal. The calibration signal corresponds to a multi-tone signal that spans the passband of interest. The multi-tone signal is generated, for example, by a method employed by OFDM modulators. In some embodiments, a control signal (e.g., Enable, Disable, Timing reference), such as Control Signal 360 is used to control the timing and/or duration of injection of the calibration signal. In some embodiments, Digital Processor 214 controls, at least in part through Control Signal 360, Calibration Signal Generator 230. For example, in some implementations, Digital Processor 214 determines the timing and/or duration of injection of the calibration signal, including the interval between injection instances and the duty cycle associated with the calibration signal. As explained above, in some implementations, the timing and/or duration of injection of the calibration signal is equal to, or an integral multiple of, the inverse of the frequency spacing between consecutive (and orthogonal) frequency components that constitute Calibration Signal 368.

Control Signal 360 controls Clock Generator 361. In some embodiments, Clock Generator 361 provides a timing reference to Quadrature Modulator 366 and to a Store 362 that stores a quadrature time series for generating orthogonal tones, also called multi-tone time-domain digital signals. In some implementations, the multi-tone time-domain digital signals are read from Store 362 and converted into analog signals by one or more Digital-to-Analog converter(s) (e.g., DAC 364-a and DAC 364-b), which provide the resulting analog signals to Quadrature Modulator 366. Quadrature Modulator 366 modulates the analog signals onto a carrier signal to produce Calibration Signal 368. From another view, Store 362 stores a time-domain representation of a target set of multi-tone signals, which are converted into an analog signal by one or more DAC's 364 and then modulated onto a carrier signal to produce the Calibration Signal 368.

In some embodiments, the calibration signal generator (e.g., Calibration Signal Generator 230) injects the calibration signal at Antenna Interface 204 at a duty cycle less than a predefined fraction (e.g., at a duty cycle less than one percent). In some embodiments, the calibration signal is injected at a low duty cycle (e.g., a duty cycle of less than 10 percent, 1 one percent, 0.1 percent or 0.02 percent). In one example, calibration signals are added for an insertion period (sometimes also called a calibration period) once per duty period (e.g., a period of time between 20 milliseconds and 2 seconds). In some embodiments, the insertion period of the calibration signal has a duration of no less than one "symbol period" of the Calibration Signal 368 (e.g., the period of time required to maintain orthogonality of all the frequency components in the calibration signal). Typically, the insertion period of the calibration signal has a duration of two or more symbol periods. In some embodiments, a very low duty cycle calibration signal minimally impacts the GNSS signal carrier to noise power density ratio (CNo).

In some embodiments, the calibration signal generator injects the calibration signal at the antenna interface as a pseudorandom or random signal, to reduce any detrimental impact on the various GNSS signal structures.

In some embodiments, the calibration signal has an amplitude at least a predefined amount (e.g., 40 dB) greater than an amplitude of the received signals from the antenna. In some embodiments, the average power of the calibration signal is less than the broadband noise floor for the signal receiver. In some implementations, the amplitude and duration of the calibration signal is determined in accordance with a criterion that the average power of the calibration signal is maintained lower than a value which would impact gain settings of a gain control circuit (e.g., an Automatic Gain Control circuit) of the signal receiver. In some embodiments, the gain control circuit corresponds to the AGC circuit of the analog signal processing circuitry of the signal receiver. In some implementations, the calibration signal is injected after fixed or variable intervals of time, such as 10 milliseconds, 10 seconds, 10 minutes, 20 minutes, etc. Maintaining intervals of time between the injection instances of the calibration signal facilitates keeping the average calibration signal power lower than a value (corresponding to the broadband noise floor of the signal receiver) that would cause the gain control circuit (e.g., the AGC circuit) to change its gain settings. In alternative embodiments, the AGC circuit may be switched off (or prevented from changing its state) during injection of the calibration signal.

In some embodiments, the calibration signal generator (e.g., Calibration Signal Generator 230) is controlled, at least in part, by the digital processor (e.g., Digital Processor 214) of the signal receiver 120. For example, the digital processor would determine the timing and/or duration of injection and potentially the interval between calibration signal injection instances. Furthermore, in some implementations having two or more receivers 206 (see FIG. 2), Calibration Signal Generator 230, under control of Digital Processor 214, injects different calibration signals for each receiver 206, with the calibration signal for each receiver 206 having a distinct set of multi-tone time-domain digital signals in Store 362, a respective duty cycle, and distinct timing from the calibration signal injected for the other receivers 206.

Figure 3E:
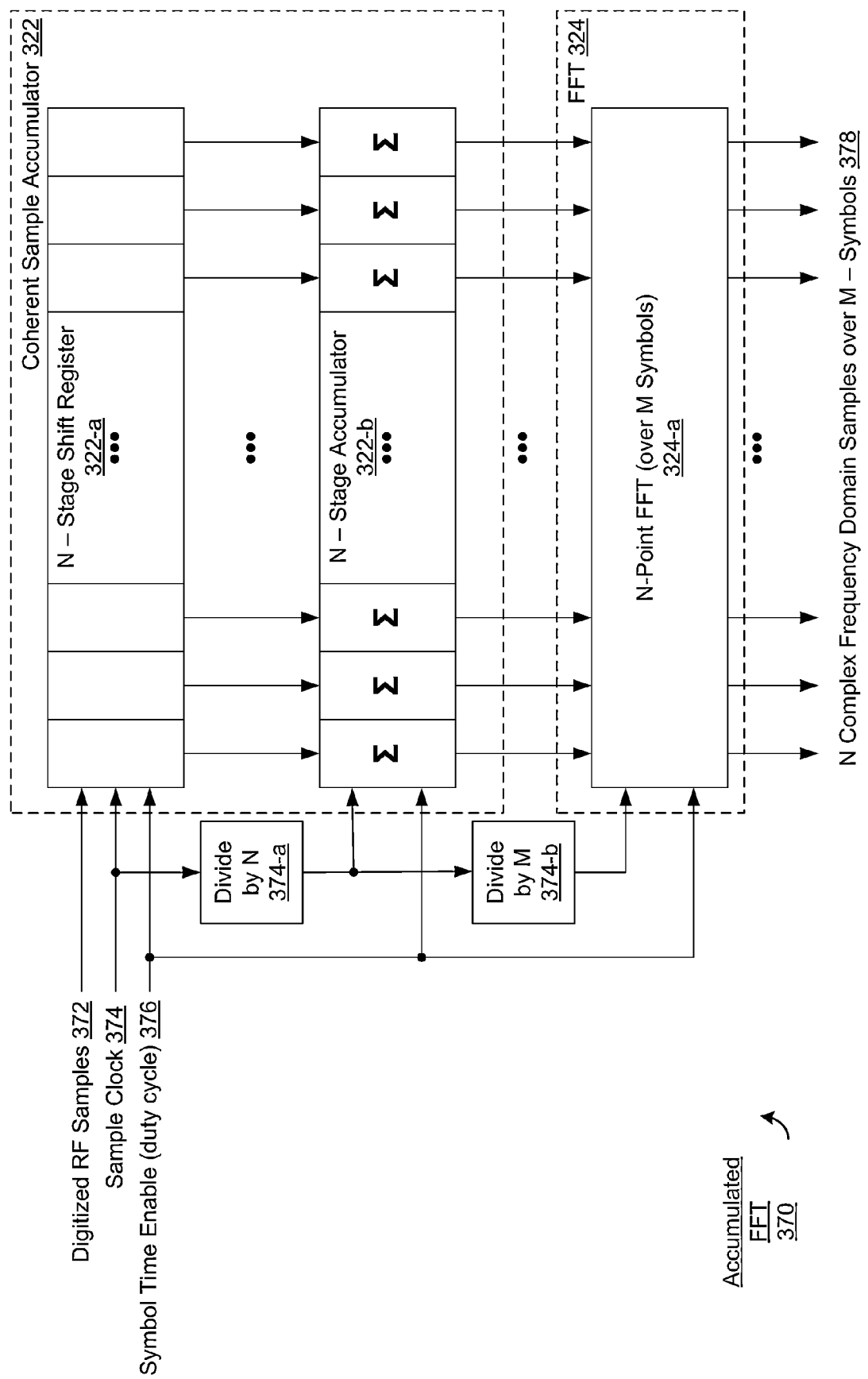

FIG. 3E is a block diagram illustrating Accumulated FFT 370, according to some embodiments. In some embodiments, Accumulated FFT 370 includes two or more registers (for example, N-Stage Shift Register 322-a and N-Stage Accumulator 322-b), each register to store and coherently accumulate (for example, using methods described elsewhere in this document) samples from a respective orthogonal baseband signal of two or more orthogonal baseband signals generated from the received signals (e.g., Digitized Received Signals 312). A coherent accumulation (e.g., sum or average) of the samples is calculated by performing a coherent (e.g., time-synchronized) summation of samples over M calibration cycles and optionally then by dividing the resulting values by the number (e.g., M) of calibration cycles (e.g., implemented using a shift register) to produce a coherent sum (and optionally, a coherent average) of samples across the M calibration cycles. In some embodiments, a coherent accumulation (e.g., an average or summation) of the samples is computed for each distinct frequency band of interest. In some implementations, the coherent accumulation across calibration cycles allows for better calibration accuracy.

To this end, Accumulated FFT 370 includes Coherent Sample Accumulator 322 and FFT 324 (as previously described with reference to Calibration Mechanism 320, in FIG. 3B). As shown in FIG. 3E, Accumulated FFT 370 receives Digitized RF Samples 372 (for example, obtained from Digitized Received Signals 312), Sample Clock 374 and Symbol Time Enable (duty cycle) 376. Accumulated FFT 370 processes Digitized RF Samples 372 to produce N Complex Frequency Domain Samples over M-Symbols 378, as described below.

Coherent Sample Accumulator 322 is used to store and coherently accumulate Digitized RF samples 372 (e.g., Digitized Received Signals 312) received by the compensation mechanism (e.g., Compensation Mechanism 212) in response to injection of the calibration signal at the antenna interface (for example by Calibration Signal Generator 230). Accordingly, Digitized RF samples 372 are shifted and stored using an N-Stage Shift Register 322-a and coherently accumulated (e.g., combined by summation or filtering approaches), and optionally, averaged using N-Stage Accumulator 322-b.

FFT 324 (e.g., N-point FFT (over M symbols) 324-a) performs a complex Fourier Transform on the coherently accumulated samples, for instance using a Fast Fourier Transform implementation.

A timing reference for the signal samples (e.g., Digitized RF Samples 372) is provided, in some implementations, using Sample Clock 374 (for example, obtained from or synchronized with Clock 240). Another timing reference, Symbol Time Enable (duty cycle) 376, enables operation of the Coherent Sample Accumulator 322 and FFT 324 at times during or corresponding to injection of the calibration signal. In some embodiments, clock dividers, Divide by N 374-a and Divide by M 374-b, divide the frequency of Sample Clock 374 by predefined values (e.g., N and M, respectively) to produce clock timing signals with reduced frequencies, as required by N-Stage Accumulator 322-b and N-point FFT (over M symbols) 324-a, respectively.

Figure 3F:
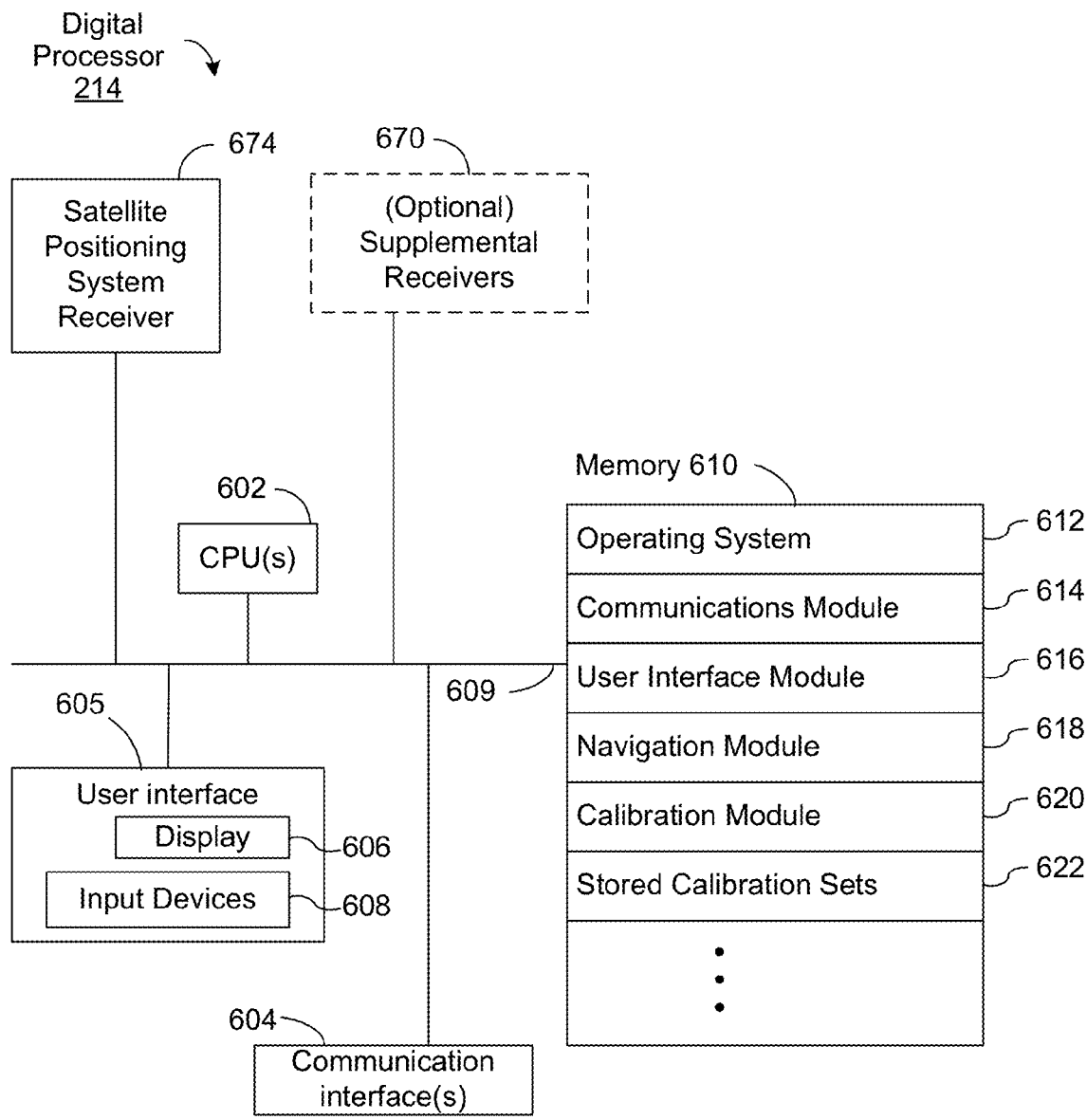

FIG. 3F is a block diagram illustrating a Digital Processor 214, according to some embodiments. Digital Processor 214 can be used in a Global Navigation Satellite System (GNSS) application shown in FIG. 1. Digital Processor 214 typically includes one or more processing units (CPU's) 602, one or more network or other communications interfaces 604, memory 610, optional supplemental receivers 670 (e.g., one or more receivers to receive navigation aiding signals, such as wide-area differential satellite positioning system signals), and one or more communication buses 609 for interconnecting these components. The communication buses 609 may include circuitry (sometimes called a chipset) that interconnects and controls communications between system components. Digital Processor 214 is coupled to a satellite positioning system receiver 674 (e.g., signal receiver 120 excluding Digital Processor 214) to receive digitized (and typically compensated) satellite signals for processing. Digital Processor 214 optionally includes a user interface 605 that includes a display device 606 and input devices 608 (e.g., keyboard, mouse, touch screen, keypads, etc.). Memory 610 includes high-speed random access memory, such as DRAM, SRAM, DDR RAM or other random access solid state memory devices; and optionally (but typically) includes non-volatile memory, such as one or more magnetic disk storage devices, optical disk storage devices, flash memory devices, or other non-volatile solid state storage devices. Memory 610 optionally includes one or more storage devices remotely located from CPU(s) 602. Memory 610, or alternately the non-volatile memory device(s) within memory 610, comprises a non-transitory computer readable storage medium. In some embodiments, memory 610 or the computer readable storage medium of memory 610 stores the following programs, modules and data structures, or a subset thereof:

- an operating system 612 that includes procedures for handling various basic system services and for performing hardware dependent tasks;
- a communication module 614 that is used for connecting Digital Processor 214 to other computers, wide-area differential satellite positioning systems, local positioning systems, etc., via the one or more communication interfaces 604 (wired or wireless) and one or more communication networks, such as the Internet, other wide area networks, local area networks, metropolitan area networks, and so on;
- optionally, a user interface module 616 that receives commands from the user via one or more input devices 608 of user interface 605, generates user interface objects in display device 606, and/or displays maps, coordinates, routes, etc., related to the position of Signal Receiver 120;
- a navigation module 618 that produces navigation results (e.g., a range to satellite, ranges to multiple satellites, geographic positioning, location information, and/or a time value) by processing digitized satellite signals received from satellite positioning system receiver 674;
- a calibration module 620 that controls when calibration signal generator 230 (FIG. 2) injects a calibration signal (e.g., the timing and/or duration of injection of the calibration signal) at the antenna interface 204 and (optionally) for controlling configuration of the compensation mechanism(s) 212; and
- optionally, stored calibration sets 622 that include multiple sets of filter coefficients (stored, for example, in a Filter Coefficients Library 358); optionally, stored calibration sets 622 correspond to previously performed calibrations (e.g., factor calibrations) for different operating conditions (e.g., for different temperature conditions).

Each of the above identified elements may be stored in one or more of the previously mentioned memory devices, and corresponds to a set of instructions for performing a function described above. The set of instructions can be executed by one or more processors (e.g., the CPUs 602). The above identified modules or programs (i.e., sets of instructions) need not be implemented as separate software programs, procedures or modules, and thus various subsets of these modules may be combined or otherwise re-arranged in various embodiments. In some embodiments, memory 610 may store a subset of the modules and data structures identified above. Furthermore, memory 610 may store additional modules and data structures not described above.

Although FIG. 3F shows a "Digital Processor," FIG. 3F is intended more as functional description of the various features which may be present in a mobile satellite navigation receiver than as a structural schematic of the embodiments described herein. In practice, and as recognized by those of ordinary skill in the art, items shown separately could be combined and some items could be separated.

Figure 4A:
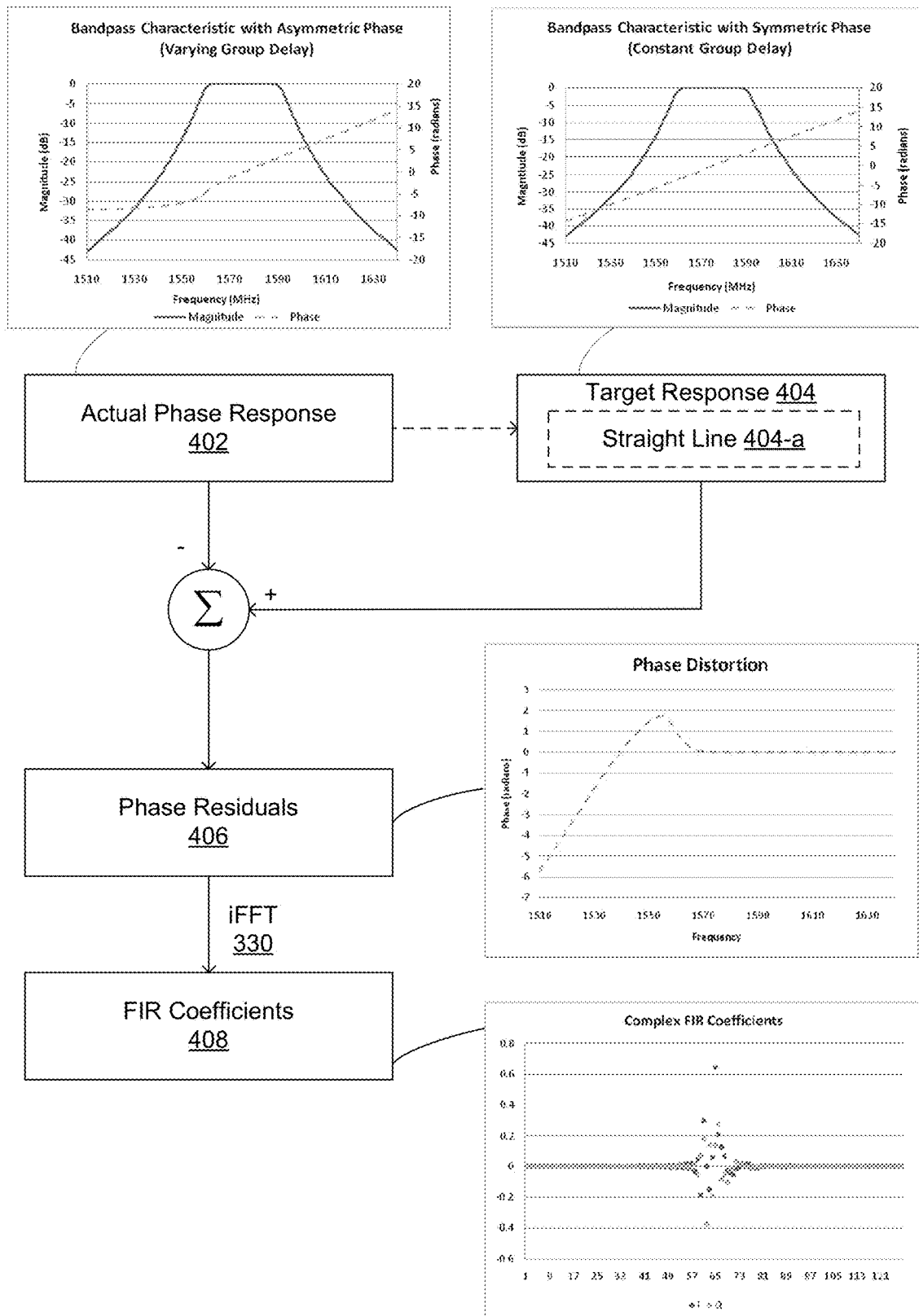
FIG. 4A includes a flow diagram illustrating configuring of a compensation mechanism of a signal receiver with group delay compensation, in accordance with some embodiments.

FIG. 4A is a flow diagram illustrating the Configuring Mechanism 320 described previously in relation to FIG. 3B. As explained previously with respect to FIG. 3B, the phase values of corresponding frequency components of the digitized received signals (e.g., Digitized Received Signals 312) represent the measured phases (e.g., Actual Phase Response 402) of the filtered signal at various frequencies present in the calibration signal. As explained above, in some embodiments, a smoothed version of the measured phase response (Actual Phase Response 402, FIG. 4A) is obtained from a polynomial fit (e.g., polynomial smoothing) to the measured phases of the filtered signal (e.g., the digitized received signal received in response to the injected calibration signal) at various frequencies. In such embodiments, the smoothed measured phase response is represented (e.g., approximated) by a polynomial of a numerical order selected to eliminate undesired noise in the polynomial representation of the measured phases of the filtered signal, while substantially preserving the effects of group delay distortions on the measured phases of the filtered signal.

In some embodiments, target phase values are previously stored. In alternative embodiments, the target phase values (e.g., Target Response Curve 326 or Target Response 404) are computed from the measured phases (e.g., Actual Phase Response 402) of the filtered signal at various frequencies, for example, using a straight line fit (e.g., Straight Line 404-*a*) to the phase values of corresponding frequency components of the digitized received signals.

In some embodiments, the residual phase differences (e.g., Residuals 328 or Phase Residuals 406) are computed by subtracting the phase values of corresponding frequency components of the digitized received signals from the target phase values. As shown in FIG. 4A, Phase Residuals 406 are computed by subtracting Actual Phase Response 402 from Target Response 404.

Figure 4B:
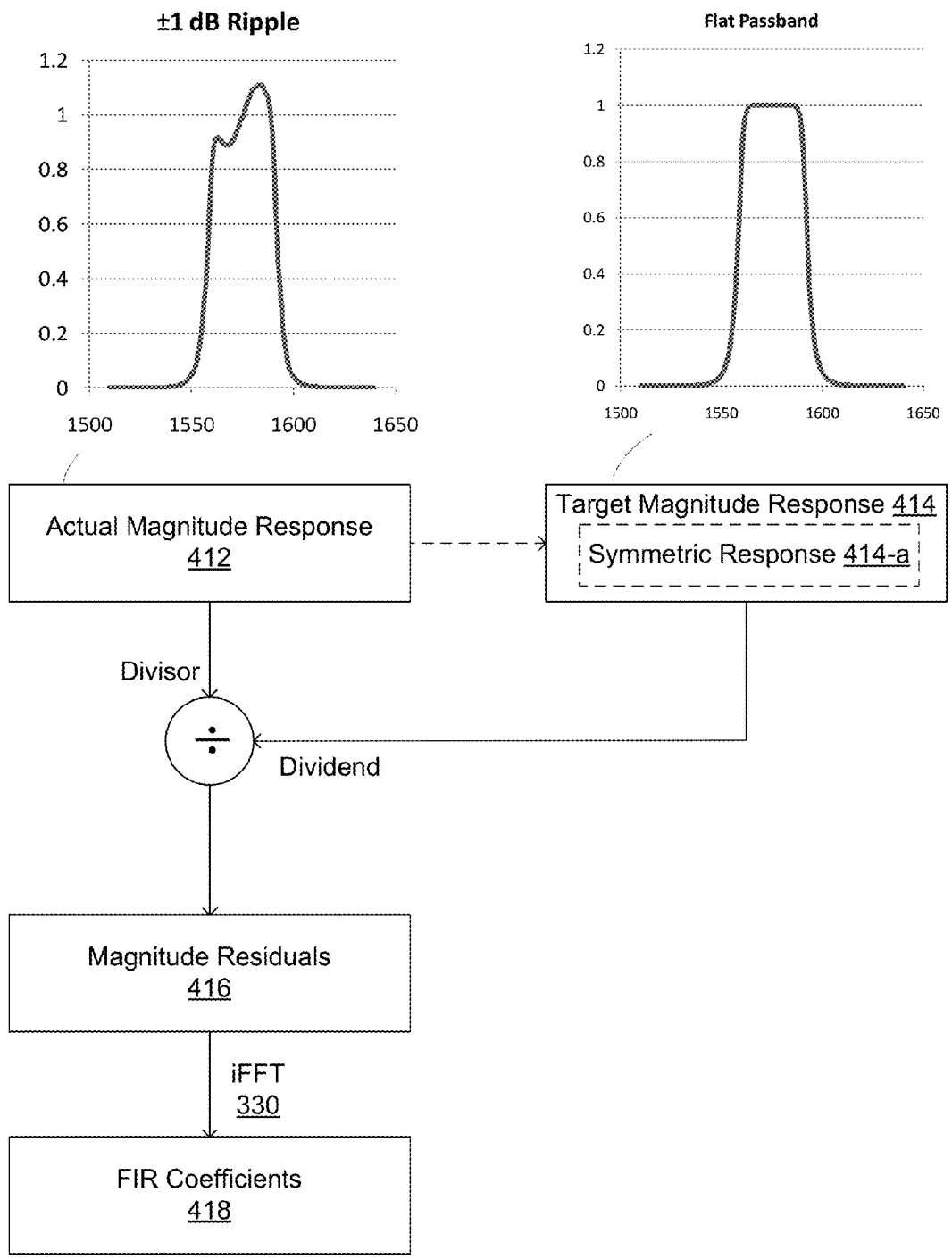
FIGS. 4B-4C include flow diagrams illustrating configuring of a compensation mechanism of a signal receiver with amplitude distortion compensation, in accordance with some embodiments.
Figure 4C:
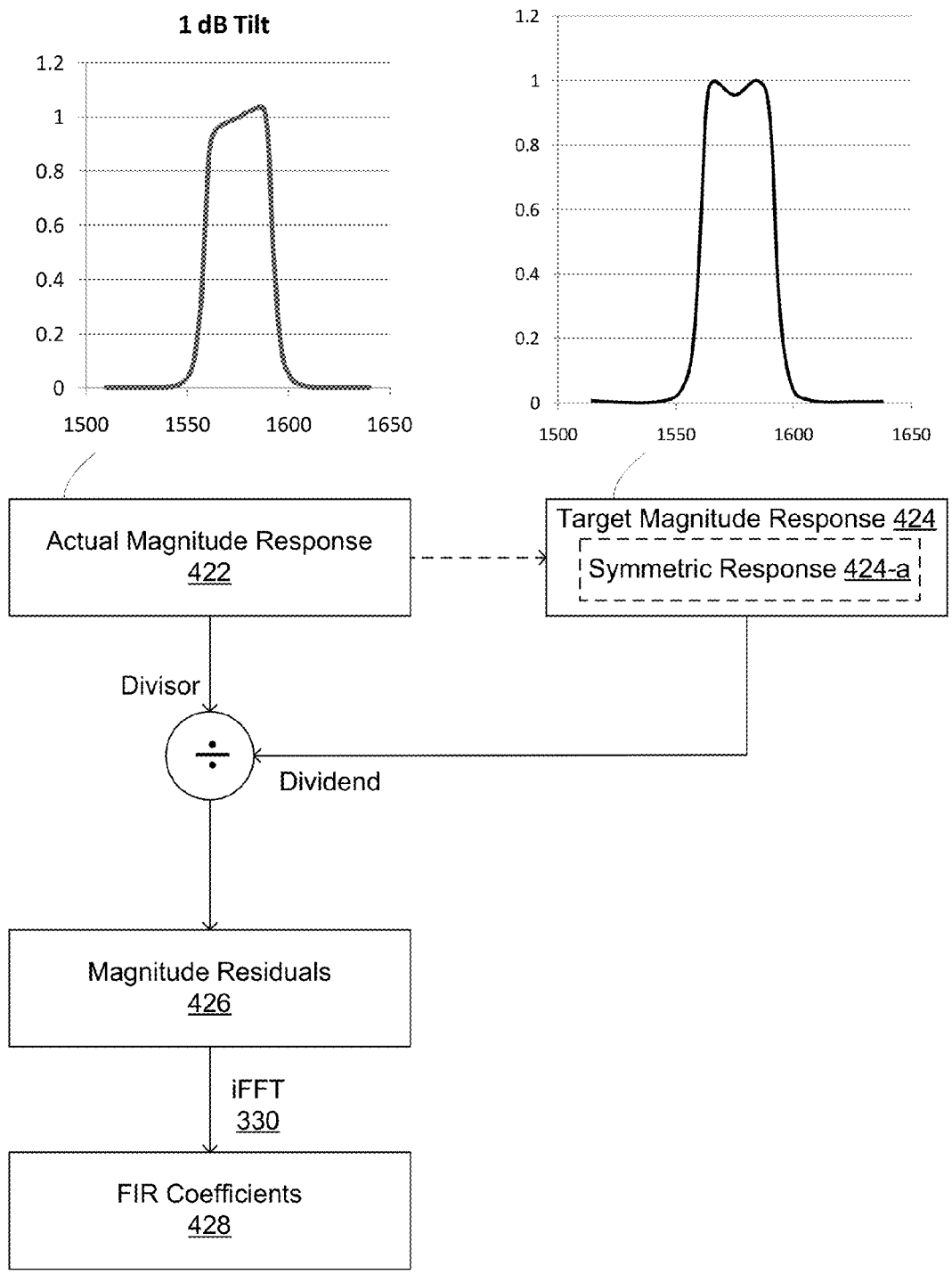

FIGS. 4B-4C are flow diagrams illustrating operation of the Configuring Mechanism 320 described previously in relation to FIG. 3B. As explained previously with respect to FIG. 3B, the magnitude values of corresponding frequency components of the digitized received signals (e.g., Digitized Received Signals 312) represent the measured magnitudes (e.g., Actual Magnitude Response 412 shown in FIG. 4B and Actual Magnitude Response 422 shown in FIG. 4C) of the filtered signal at various frequencies present in the calibration signal.

In some embodiments, target magnitude values are previously stored. In alternative embodiments, the target magnitude values (e.g., Target Response Curve 326 or Target Magnitude Response 414 shown in FIG. 4B or Target Magnitude Response 424 shown in FIG. 4C) are computed from the measured magnitudes (e.g., Actual Magnitude Response 412) of the filtered signal at various frequencies, for example, by finding a best fit flat magnitude response or a best fit symmetric magnitude response.

In some embodiments, the magnitude response residuals (e.g., Residuals 328 or Magnitude Residuals 416 shown in FIG. 4B or Magnitude Residuals 426 shown in FIG. 4C) are computed by determining amplitude ratios between one or more target amplitude values and amplitude values of corresponding frequency components of the digitized received signals. As shown in FIG. 4B and FIG. 4C, Magnitude Residuals 406 and Magnitude Residuals 416 are computed by dividing Target Magnitude Response 414 (or 424, FIG. 4C) by Actual Magnitude Response 412 (or 422, FIG. 4C).

In FIGS. 4A-4C, the complex filter coefficients (e.g., Complex FIR coefficients 334 or FIR Coefficients 408, FIR Coefficients 418, or FIR Coefficients 428) of the FIR filter (e.g., Complex FIR 314) correspond to residual phase differences (e.g., Residuals 328 or Phase Residuals 406) between target phase values (e.g., Target Response Curve 326 or Target Response 404) and phase values (e.g., Actual Phase Response 402) of corresponding frequency components of the digitized received signals (e.g., Digitized Received Signals 312), and residual magnitude ratios (e.g., Residuals 328 or Magnitude Residuals 416 or Magnitude Residuals 426) between target magnitude values (e.g., Target Response Curve 326 or Target Magnitude Response 414 or Target Magnitude Response 424) and magnitude values (e.g., Actual Magnitude Response 412 or Actual Magnitude Response 422) of corresponding frequency components of the digitized received signals (e.g., Digitized Received Signals 312). An inverse FFT (e.g., iFFT 330) is performed on the residual phase differences (e.g., Residuals 328 or Phase Residuals 406) and magnitude response residuals (e.g., Magnitude Residuals 416 or Magnitude Residuals 426), which results in the complex filter coefficients (e.g., Complex FIR coefficients 334 or FIR Coefficients 408) of the FIR filter (e.g., Complex FIR 314). Alternatively, the iFFT produces an initial set of complex filter coefficients, which are then multiplied by a windowing function (e.g., a Tukey window) to produce the complex filter coefficients used by an FIR filter in the Compensation Mechanism 212 to filter digitized received signals to produce compensated digitized received signals.

FIGS. 5A-5C and FIG. 5D include a flowchart representing method 500 and method 570 respectively for signal compensation performed at a signal receiver (e.g., Signal Receiver 120), according to certain embodiments of the invention. Method 500 and method 570 may be governed by instructions that are stored in a computer readable storage medium and that are executed by one or more processors of one or more servers. Each of the operations shown in FIGS. 5A-5D may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

Figure 5A:
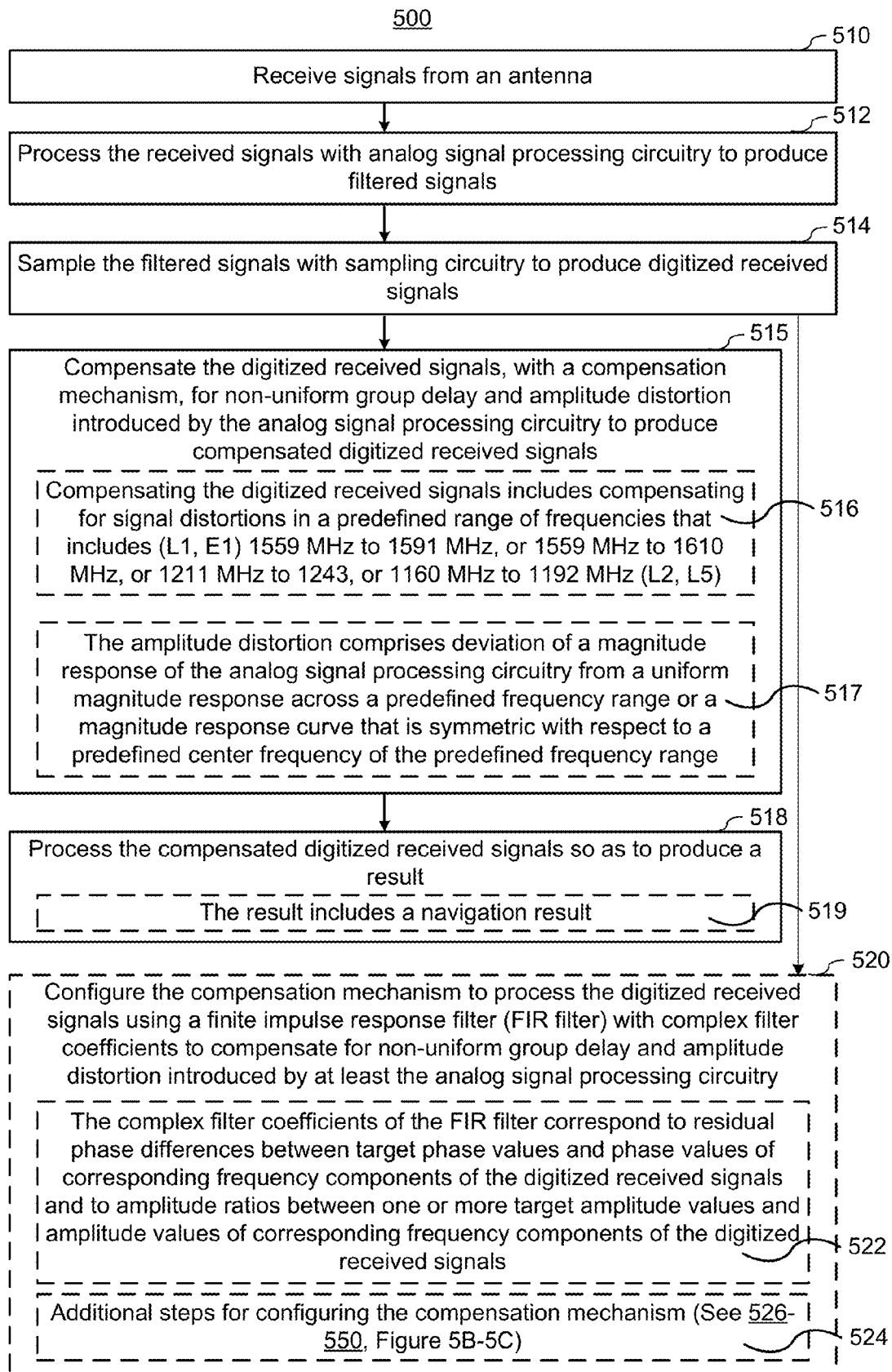
FIGS. 5A-5D include flow charts illustrating methods of signal compensation at a signal receiver, in accordance with some embodiments.
Figure 5B:
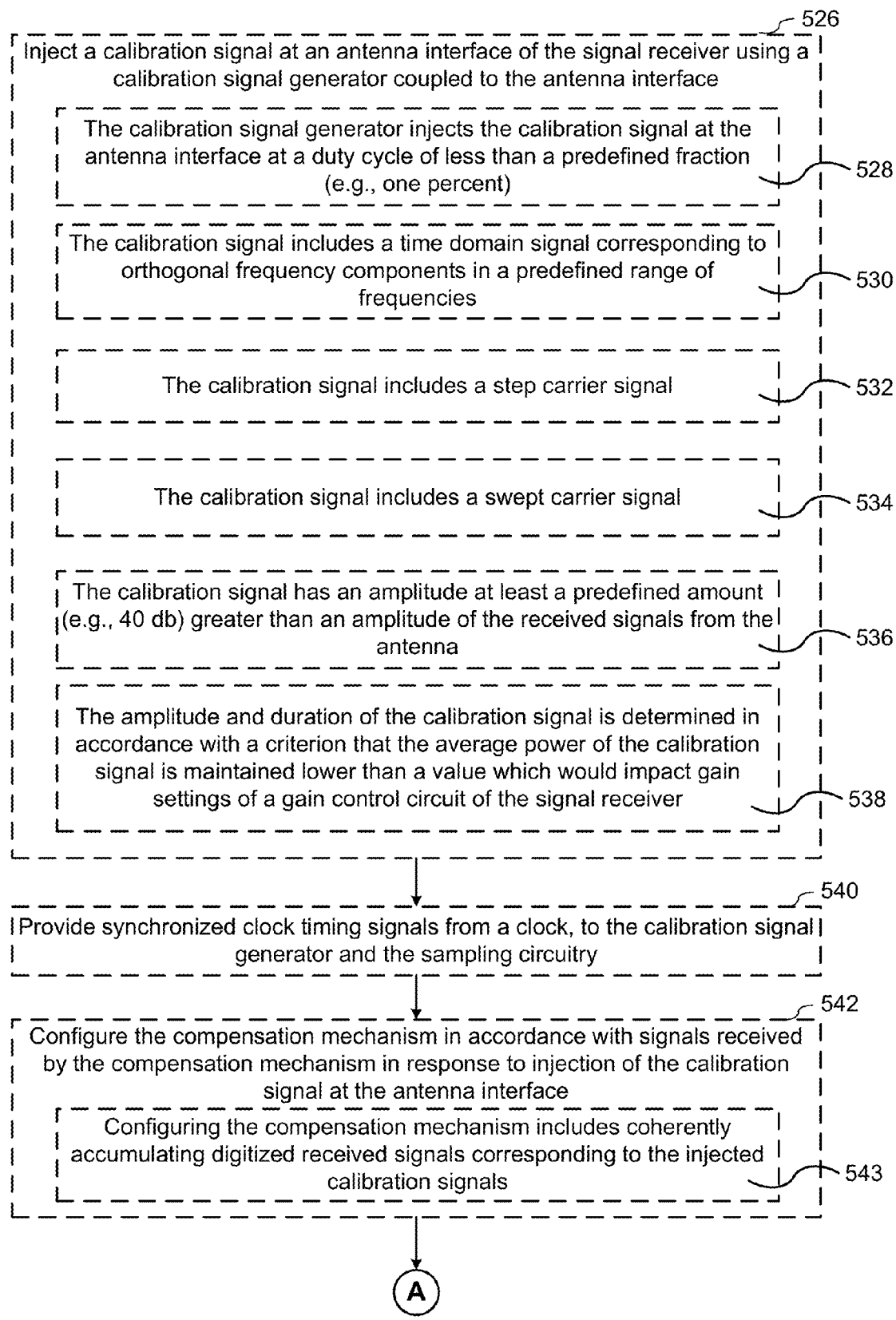
Figure 5C:
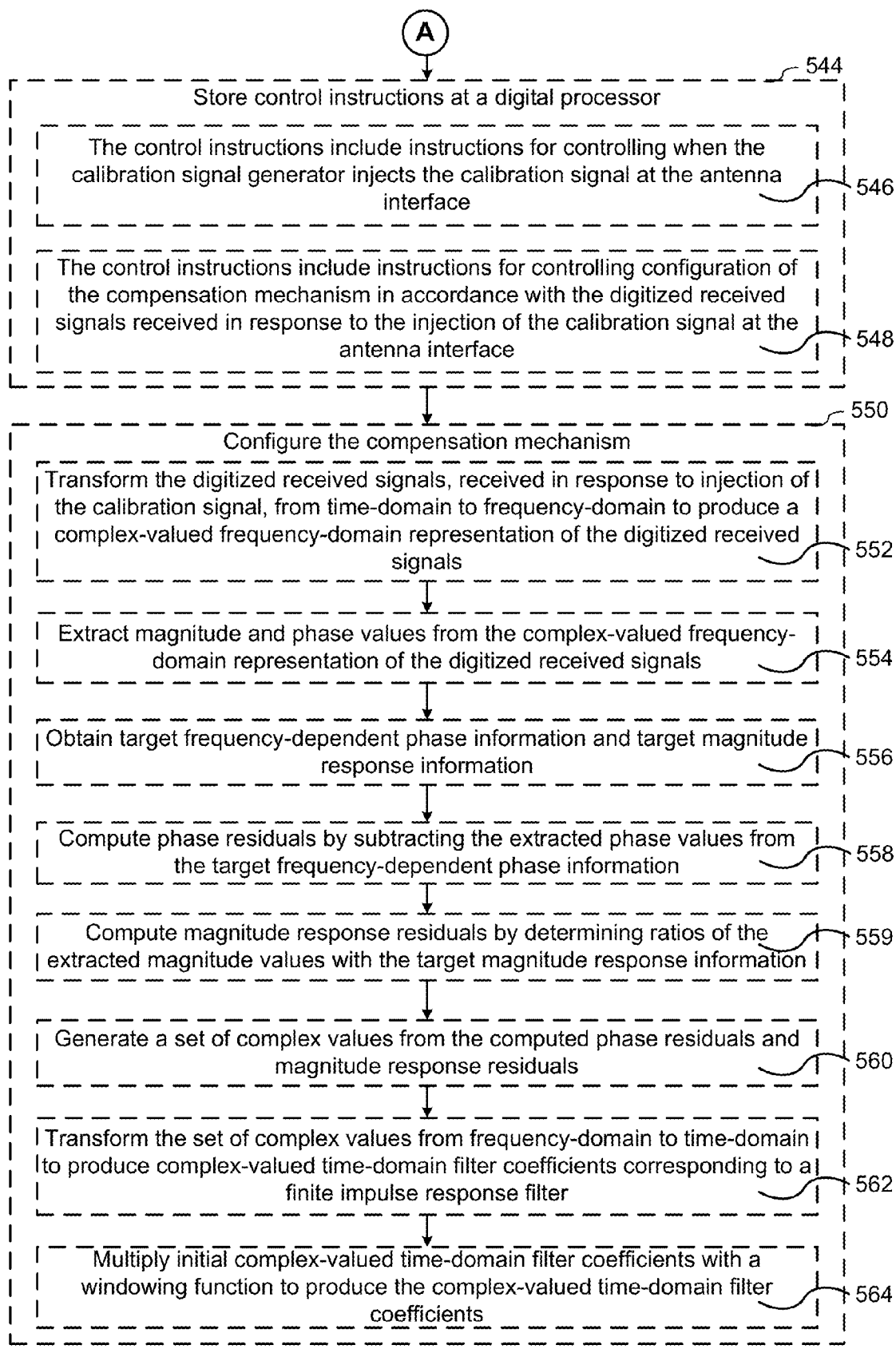

According to method 500 shown in FIGS. 5A-5C, a signal receiver (e.g., Signal Receiver 120) receives (510) signals from an antenna (e.g., Antenna 202). The signal receiver processes (512) the received signals with analog signal processing circuitry (e.g., Analog Signal Processing Circuitry 208) to produce filtered signals. The signal receiver samples (514) the filtered signals with sampling circuitry (e.g., Sampling Circuitry 210) to produce digitized received signals (e.g., Digitized Received Signals 312).

The signal receiver compensates (515) the digitized received signals, with a compensation mechanism (e.g., Compensation Mechanism 212), for non-uniform group delay and amplitude distortion introduced by the analog signal processing circuitry to produce compensated digitized received signals (e.g., Compensated Digitized Received Signals 316). In some embodiments, compensating the digitized received signals includes (516) compensating for signal distortions in a predefined range of frequencies. For example, if the signal receiver is a GPS signal receiver, the predefined range of frequencies optionally includes one or more of: (L1, E1) 1559 MHz-1591 MHz, 1559 MHz to 1610 MHz, (L2, L5) 1211 MHz-1243 MHz, and 1160 MHz-1192 MHz. In some embodiments, the amplitude distortion comprises (517) deviation of a magnitude response of the analog signal processing circuitry from a uniform magnitude response across a predefined frequency range or a magnitude response curve that is symmetric with respect to a predefined center frequency of the predefined frequency range. For example, as shown in FIGS. 4B-4C, target magnitude response curve (e.g., Target Magnitude Response 414 and Target Magnitude Response 424) are symmetric with respect to a predefined center frequency of the predefined frequency range.

The signal receiver processes (518) the compensated digitized received signals so as to produce a result (e.g., Result 220). In some implementations, the result includes (519) a navigation result. For example, the result includes a range to satellite, ranges to multiple satellites, navigation result(s), geographical location(s), and/or satellite time value(s).

In some embodiments, the signal receiver configures (520) the compensation mechanism to process the digitized received signals using a finite impulse response filter (FIR filter), such as Complex FIR 314 (FIG. 3B), with complex filter coefficients (e.g., Complex FIR coefficients 334 shown in FIG. 3B) to compensate for non-uniform group delay and amplitude distortion introduced by at least the analog signal processing circuitry. In some embodiments, the set of complex filter coefficients of the FIR filter correspond to residual phase differences between target phase values and phase values of corresponding frequency components of the digitized received signals and to amplitude ratios between one or more target amplitude values and amplitude values of corresponding frequency components of the digitized received signals. For example, as shown in and explained with reference to FIG. 4A-4C, FIR Coefficients 408 are obtained from an inverse transform (iFFT 330) of Phase Residuals 406 and Magnitude Residuals 416 (or Magnitude Residuals 426). Phase Residuals 406 are the differences between (i.e., obtained from subtracting) Target Response 404 and Actual Phase Response 402. Magnitude Residuals 416 are the ratios between (i.e., obtained from dividing) Target Magnitude Response 414 and Actual Magnitude Response 412. In some embodiments, Signal Receiver 120 performs additional steps for configuring (524) Compensation Mechanism 212 as described in steps 526-550 described below.

The signal receiver injects (526) a calibration signal at the antenna interface (e.g., Antenna Interface 204) of the signal receiver using a calibration signal generator (e.g., Calibration Signal Generator 230) coupled to the antenna interface. In some embodiments, the calibration signal generator injects (528) the calibration signal at the antenna interface at a duty cycle of less than a predefined fraction (e.g., one percent). In some embodiments, the calibration signal includes (530) a time domain signal corresponding to orthogonal frequency components in a predefined range of frequencies. In some embodiments, the calibration signal includes (532) a step carrier signal. In some embodiments, the calibration signal includes (534) a swept carrier signal. In some embodiments, the calibration signal has (536) an amplitude at least a predefined amount (e.g., 40 dB) greater than an amplitude of the received signals from the signal receiver's antenna (e.g., Antenna 202). In some implementations, the amplitude and duration of the calibration signal is determined (538) in accordance with a criterion that the average power of the calibration signal is maintained lower than a value which would impact gain settings of a gain control circuit of the signal receiver. Operation of the calibration signal generator is further described with reference to FIG. 3D above.

In some embodiments, the signal receiver provides (540) synchronized clock timing signals from a clock (e.g., Clock 240), to the signal receiver's calibration signal generator and sampling circuitry.

In some implementations, Signal Receiver 120 configures (542) Compensation Mechanism 212 in accordance with signals received by Compensation Mechanism 212 in response to injection of the calibration signal at Antenna Interface 204. In some embodiments, configuring Compensation Mechanism 212 includes (543) coherently accumulating digitized received signals corresponding to the injected calibration signals. For example, as shown in FIG. 3E, Coherent Sample Accumulator 322 (including two or more registers) is used to coherently accumulate digitized received signals corresponding to the injected calibration signals.

In some embodiments, Signal Receiver 120 stores (544) control instructions at Digital Processor 214. In some implementations, control instructions include (546) instructions for controlling when Calibration Signal Generator 230 injects the calibration signal at Antenna Interface 204. In some implementations, control instructions include (548) instructions for controlling configuration of Compensation Mechanism 212 in accordance with the digitized received signals received in response to the injection of the calibration signal at Antenna Interface 204.

In some embodiments, Signal Receiver 120 configures (550) Compensation Mechanism 212 by performing additional, or alternative, steps 552-564 described next, for example using Configuring Mechanism 320 (shown and described above with reference to FIG. 3B).

In some embodiments, Signal Receiver 120 transforms (552) the digitized received signals, received in response to injection of the calibration signal, from time-domain to frequency-domain to produce a complex-valued frequency-domain representation of the digitized received signals. It may be noted that a real-valued representation is a special case of a complex-valued representation. In some implementations, the transformation from time-domain to frequency-domain is a Discrete Fourier Transform implemented using, for example, a Fast Fourier Transform (FFT) implementation. As described in relation to the example embodiment in FIGS. 3B and 3E, an FFT 324 is be used to produce N Complex Frequency Domain Samples over M-Symbols 378.

In some embodiments, Signal Receiver 120 extracts (554) magnitude (e.g., Actual Magnitude Response 412, FIG. 4B) and phase (e.g., Actual Phase Response 402, FIG. 4A) values from the complex-valued frequency-domain representation of the digitized received signals. For example, for a complex number z=x+jy; where x is a real component and y is an imaginary component, the magnitude (r) and phase (φ) of complex number z are obtained as:

$$r = |z| = \sqrt{x^2 + y^2}, \text{ and}$$

$$\varphi = \arg(z) = \begin{cases} \arctan\left(\frac{y}{x}\right) & \text{if } x > 0 \\ \arctan\left(\frac{y}{x}\right) + \pi & \text{if } x < 0 \text{ and } y \geq 0 \\ \arctan\left(\frac{y}{x}\right) - \pi & \text{if } x < 0 \text{ and } y < 0 \\ \frac{\pi}{2} & \text{if } x = 0 \text{ and } y > 0 \\ -\frac{\pi}{2} & \text{if } x = 0 \text{ and } y < 0 \\ \text{indeterminate} & \text{if } x = 0 \text{ and } y = 0. \end{cases}$$

In some embodiments, if the total phase change (or phase shift) over the frequency span or bandwidth of the digitized received signals exceeds $2\pi$ radians, resulting discontinuities (e.g., due to phase-wrapping) in the phase (e.g., Actual Phase Response 402, FIG. 4A) of the digitized received signals are eliminated, for example by methods such as "phase unwrapping" (e.g., by the addition or subtraction of integer multiples of $2\pi$ radians). As a result, the phase (e.g., Actual Phase Response 402, FIG. 4A) of the digitized received signals is converted to a continuous function of frequency by eliminating discontinuities introduced, for example, by phase-wrapping.

In some implementations, Signal Receiver 120 obtains (556) target frequency-dependent phase information and target magnitude response information. For example, target frequency-dependent phase information (Target Response Curve 326 in FIG. 3B or Target Response 404 in FIG. 4A) corresponds to a desired set of frequency-dependent phase values stored previously or generated from phase values (e.g., Actual Phase Response 402, FIG. 4A) of corresponding frequency components. In some embodiments, the target (also referred to herein as "desired") frequency-dependent phase information is a polynomial (for example, linear) relationship between phase and frequency. A polynomial relationship between phase and frequency is obtained, for example, using a polynomial fit (e.g., a straight line fit such as Straight Line 404-a shown in FIG. 4A) to the (actual) extracted phase information (e.g., Actual Phase Response 402, FIG. 4A) or by using an arbitrary polynomial (for example, a straight line of known slope). Thus, it will be understood that the target frequency-dependent phase information is obtained either by generating this information using curve fitting (or the like) on phase information extracted during calibration, or by retrieving predefined information, such as a "target" polynomial or straight line. In some implementations, target magnitude response information (Target Response Curve 326 in FIG. 3B or Target Magnitude Response 414 in FIG. 4B) corresponds to a desired set of frequency-dependent magnitude values stored previously or generated from magnitude values (e.g., Actual Magnitude Response 412, FIG. 4B) of corresponding frequency components. In some embodiments, the target (also referred to herein as "desired") magnitude response information is a polynomial (for example, symmetric) relationship between phase and frequency.

In some embodiments, Signal Receiver 120 computes (558) phase residuals by subtracting the extracted phase values from the target frequency-dependent phase information. For example, as shown in FIG. 4A, Phase Residuals 406 are computed by subtracting Actual Phase Response 402 from Target Response 404. In some embodiments, Signal Receiver 120 computes (559) magnitude response residuals by determining ratios of the extracted magnitude values with the target magnitude response information. For example, as shown in FIG. 4B, Magnitude Residuals 416 are computed by dividing Actual Magnitude Response 412 (as the dividend) by Target Magnitude Response 414 (as the divisor).

In some embodiments, Signal Receiver 120 generates (560) a set of complex values from the computed phase residuals and magnitude response residuals. For example, if a computed phase residual is 'θ' and the computed magnitude response residual is 'R' for a given frequency, then the complex value generated for that frequency corresponding to magnitude 'R' and phase residual 'θ' would be of the form R×(cos θ+j sin θ).

In some implementations, Signal Receiver 120 transforms (562) the set of complex values (e.g., complex filter response) from frequency-domain to time-domain to produce complex-valued time-domain filter coefficients (e.g., FIR Coefficients 408, FIG. 4A) corresponding to a finite impulse response filter (e.g., Complex FIR 314, FIG. 3B). In some embodiments, the transformation from frequency-domain to time-domain is an Inverse Discrete Fourier Transform, implemented, for example, through an inverse Fast Fourier Transform (iFFT) implementation (e.g., iFFT 330, FIG. 3B).

In some implementations Signal Receiver 120 multiplies (564) initial complex-valued time-domain filter coefficients with a windowing function (e.g., a Tukey window) to produce the complex-valued time-domain filter coefficients. In other words, the step of transforming includes multiplying an initial set of complex-valued time-domain filter coefficients by a windowing function (e.g., Windowing 332, FIG. 3B) to produce the complex-valued time-domain filter coefficients (e.g., FIR Coefficients 408, FIG. 4A) corresponding to a finite impulse response filter (e.g., Complex FIR 314, FIG. 3B). The resulting coefficients are used by the FIR filter during normal operation to compensate for group delay distortions at the signal receiver.

Figure 5D:
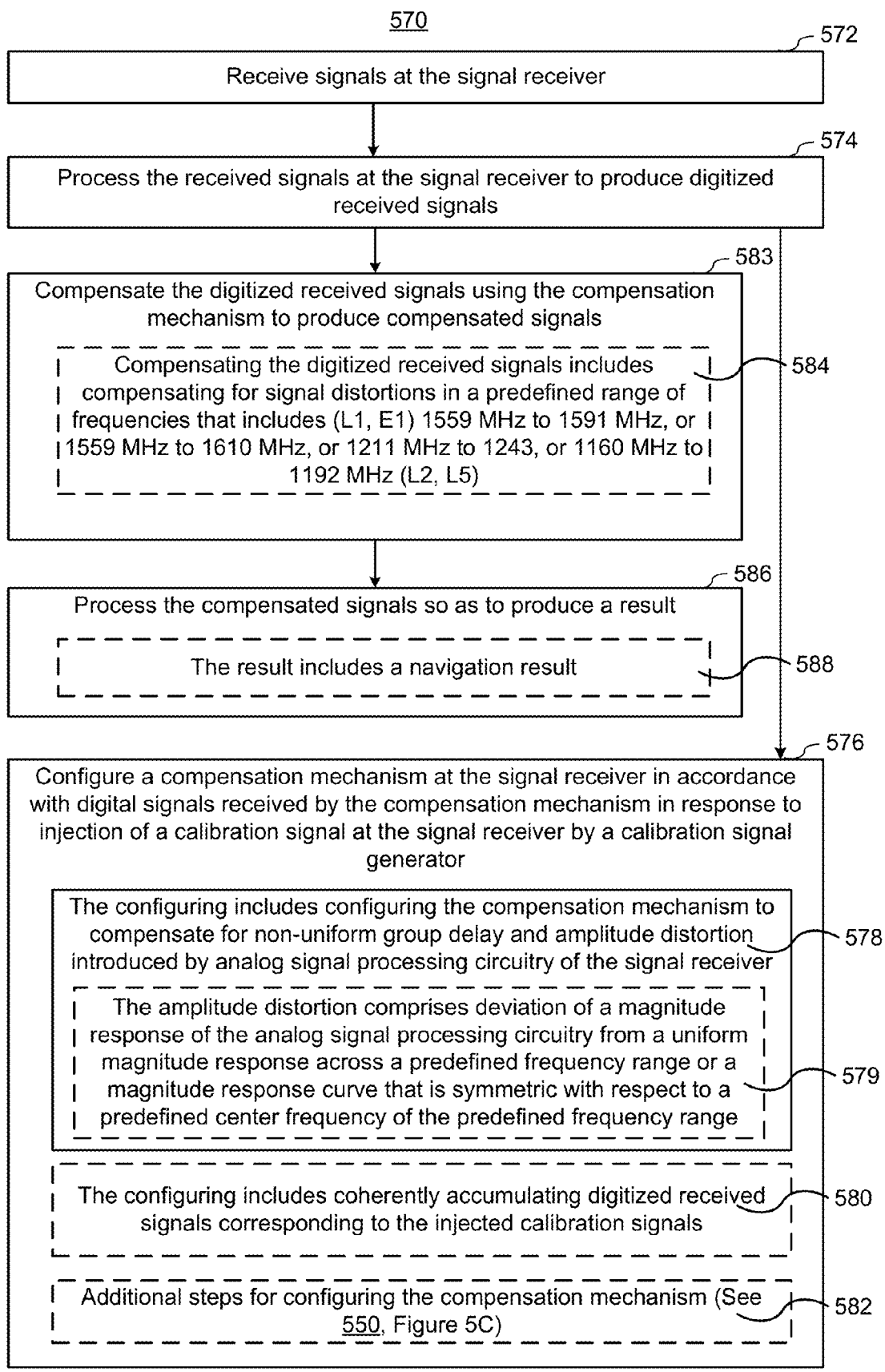

According to method 570 shown in FIG. 5D, a signal receiver (for example, but not limited to Signal Receiver 120) receives (572) signals. The signal receiver processes (574) the received signals at the signal receiver to produce digitized received signals.

The signal receiver configures (576) a compensation mechanism (for example, but not limited to Compensation Mechanism 212) at the signal receiver in accordance with digital signals received by the compensation mechanism in response to injection of a calibration signal at the signal receiver by a calibration signal generator (for example, but not limited to Calibration Signal Generator 230). The configuring includes (578) configuring the compensation mechanism to compensate for non-uniform group delay and amplitude distortion introduced by analog signal processing circuitry of the signal receiver. In some embodiments, the amplitude distortion comprises (579) deviation of a magnitude response of the analog signal processing circuitry from a uniform magnitude response across a predefined frequency range or a magnitude response curve that is symmetric with respect to a predefined center frequency of the predefined frequency range. For example, as shown in FIGS. 4B-4C, target magnitude response curve (e.g., Target Magnitude Response 414 and Target Magnitude Response 424) are symmetric with respect to a predefined center frequency of the predefined frequency range. In some embodiments, configuring includes (580) coherently accumulating digitized received signals corresponding to the injected calibration signals. In some embodiments, the signal receiver configures (582) the compensation mechanism by performing additional steps (e.g., all or a subset of steps 552-564, FIG. 5C) described above with regard to method 500. In some implementations, the step (576) of configuring the compensation mechanism is performed at various instances in time (e.g., intermittently and/or periodically), for example based on control signals provided by a digital processor at the signal receiver.

The signal receiver compensates (583) the digitized received signals using the compensation mechanism to produce compensated signals. In some embodiments, compensating the digitized received signals includes (584) compensating for signal distortions in a predefined range of frequencies that includes (L1, E1) 1559 MHz-1591 MHz, or 1559 MHz to 1610 MHz, or (L2, L5) 1211 MHz-1243 MHz, or 1160 MHz-1192 MHz.

The signal receiver processes (586) the compensated signals so as to produce a result. In some implementations, the result includes (588) a navigation result. For example, the result includes a range to satellite, ranges to multiple satellites, navigation result(s), geographical location(s), and/or satellite time value(s).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A signal receiver, comprising:
   an antenna interface for receiving signals from an antenna;
   a calibration signal generator, coupled to the antenna interface, to inject a calibration signal at the antenna interface, the calibration signal comprising a multi-tone signal having a plurality of orthogonal frequency components in a predefined range of frequencies;
   analog signal processing circuitry coupled to the antenna interface for processing the received signals to produce filtered signals;
   sampling circuitry to sample the filtered signals so as to produce digitized received signals; and
   a digital compensator to receive the digitized received signals and compensate for non-uniform group delay and amplitude distortion introduced by the analog signal processing circuitry to produce compensated digitized received signals, wherein the digital compensator is configured in accordance with phase and amplitude values produced by a Fourier transform of signals received by the digital compensator in response to injection of the calibration signal at the antenna interface, the Fourier transform producing the phase and amplitude values for a plurality of frequencies corresponding to the orthogonal frequency components of the calibration signal.

2. The signal receiver of claim 1, wherein the digital compensator is configured to process the digitized received signals using a finite impulse response filter (FIR filter) with complex filter coefficients to compensate for non-uniform group delay and amplitude distortion introduced by at least the analog signal processing circuitry.

3. The signal receiver of claim 2, wherein the complex filter coefficients of the FIR filter correspond to residual phase differences between target phase values and the phase values produced by the Fourier transform and to amplitude ratios between one or more target amplitude values and the amplitude values produced by the Fourier transform.

4. The signal receiver of claim 1, wherein the amplitude distortion comprises deviation of a magnitude response of the analog signal processing circuitry from a uniform magnitude response across a predefined frequency range or a magnitude response curve that is symmetric with respect to a predefined center frequency of the predefined frequency range.

5. The signal receiver of claim 1, wherein the calibration signal is selected from the group consisting of a time domain signal corresponding to orthogonal frequency components in a predefined range of frequencies, a step carrier signal, and a swept carrier signal.

6. The signal receiver of claim 1, wherein a digital processor controls the configuration of the digital compensator, in part, by performing a sequence of operations, comprising:
   a time-to-frequency domain transformation of the digitized received signals, received in response to the calibration signal injected at the antenna interface, to produce a complex-valued frequency-domain representation of the digitized received signals;

an extraction of magnitude and phase values from the complex-valued frequency-domain representation of the digitized received signals;

obtaining target frequency-dependent phase information and target magnitude response information;

a computation of phase residuals by subtraction of the extracted phase values from the target frequency-dependent phase information;

a computation of magnitude response residuals by determining ratios of the extracted magnitude values with the target magnitude response information;

generating a set of complex values from the computed phase residuals and magnitude response residuals; and a frequency-to-time domain transformation of the set of complex values to produce complex-valued time-domain filter coefficients corresponding to a finite impulse response filter.

7. The signal receiver of claim 6, wherein the sequence of operations further includes multiplying an initial set of complex-valued time-domain filter coefficients by a windowing function to produce the complex-valued time-domain filter coefficients corresponding to a finite impulse response filter.

8. The signal receiver of claim 1, wherein the calibration signal generator injects the calibration signal at the antenna interface at a duty cycle of less than one percent.

9. The signal receiver of claim 1, further comprising a housing, wherein the antenna interface, the analog signal processing circuitry, the sampling circuitry, the digital compensator, and the calibration signal generator are contained in the housing.

10. The signal receiver of claim 1, wherein the calibration signal has an amplitude at least 40 dB greater than an amplitude of the received signals from the antenna.

11. The signal receiver of claim 1, wherein the amplitude and duration of the calibration signal is determined in accordance with a criterion that the average power of the calibration signal is maintained lower than a value which would impact gain settings of a gain control circuit of the signal receiver.

12. The signal receiver of claim 1, further comprising a clock to provide synchronized clock timing signals to the calibration signal generator and the sampling circuitry.

13. The signal receiver of claim 1, further comprising a single circuit board, wherein the antenna interface, the analog signal processing circuitry, the sampling circuitry, the digital compensator, and the calibration signal generator are mounted on the single circuit board.

14. The signal receiver of claim 1, wherein the calibration signal generator is controlled, at least in part, by a digital processor.

15. The signal receiver of claim 14, wherein the digital processor includes:

control instructions for controlling when the calibration signal generator injects the calibration signal at the antenna interface and for controlling configuration of the digital compensator in accordance with the digitized received signals received in response to the injection of the calibration signal at the antenna interface.

16. The signal receiver of claim 1, wherein the signal receiver is a satellite signal receiver and the digital compensator compensates for signal distortions produced by the analog signal processing circuitry in one or more predefined ranges of frequencies corresponding to frequencies of satellite signals received by the signal receiver.

17. The signal receiver of claim 1, further comprising a plurality of registers, each register to store and average samples from a respective orthogonal baseband signal of a plurality of orthogonal baseband signals generated from the received signals.

18. The signal receiver of claim 1, further comprising a digital processor to process the compensated digitized received signals so as to produce a navigation result.

19. The signal receiver of claim 18, wherein the navigation result is selected from the group consisting of one or more ranges to one more satellites, geographical positioning or location information, and a time value.

20. A method of signal compensation performed at a signal receiver, the method comprising:

injecting a calibration signal at the signal receiver using a calibration signal generator, wherein the calibration signal comprises a multi-tone signal having a plurality of orthogonal frequency components in a predefined range of frequencies;

configuring a digital compensator at the signal receiver in accordance with digital signals received by the digital compensator in response to injection of the calibration signal at the signal receiver, the configuring including:

producing phase and amplitude values using a Fourier transform of the signals received by the digital compensator in response to injection of the calibration signal at the signal receiver, wherein the Fourier transform produces the phase and amplitude values for a plurality of frequencies corresponding to the orthogonal frequency components of the calibration signal;

configuring the digital compensator in accordance with the phase and amplitude values produced by the Fourier transform to compensate for non-uniform group delay and amplitude distortion introduced by analog signal processing circuitry of the signal receiver;

receiving signals at the signal receiver;

processing the received signals at the signal receiver to produce digitized received signals; and compensating the digitized received signals using the digital compensator to produce compensated signals.

21. The method of claim 20, wherein configuring the digital compensator comprises:

transforming the digital signals received by the digital compensator from time-domain to frequency-domain to produce a complex-valued frequency-domain representation of the processed digital signals;

extracting magnitude and phase values from the complex-valued frequency-domain representation of the processed digital signals;

obtaining target frequency-dependent phase information and target magnitude response information;

computing phase residuals by subtracting the extracted phase values from the target frequency-dependent phase information;

computing magnitude response residuals by determining ratios of the extracted magnitude values with the target magnitude response information;

generating a set of complex values from the computed phase residuals and magnitude response residuals; and transforming the set of complex values from frequency-domain to time-domain to produce complex-valued time-domain filter coefficients corresponding to a finite impulse response filter.

22. The method of claim 21, wherein the transforming includes multiplying an initial set of complex-valued time-domain filter coefficients by a windowing function to produce the complex-valued time-domain filter coefficients corresponding to a finite impulse response filter.

23. A method of signal compensation performed at a signal receiver, the method comprising:
- injecting a calibration signal at the signal receiver using a calibration signal generator, the calibration signal comprising a multi-tone signal having a plurality of orthogonal frequency components in a predefined range of frequencies;
- receiving signals from an antenna;
- processing the received signals with analog signal processing circuitry to produce filtered signals;
- sampling the filtered signals with sampling circuitry to produce digitized received signals; and
- compensating the digitized received signals, with a digital compensator, for non-uniform group delay and amplitude distortion introduced by the analog signal processing circuitry to produce compensated digitized received signals, wherein the digital compensator is configured in accordance phase and amplitude values produced by a Fourier transform of signals received by the digital compensator in response to injection of the calibration signal at the signal receiver, the Fourier transform producing the phase and amplitude values for a plurality of frequencies corresponding to the orthogonal frequency components of the calibration signal.

24. The method of claim 23, further including configuring the digital compensator to process the digitized received signals using a finite impulse response filter (FIR filter) with complex filter coefficients to compensate for non-uniform group delay and amplitude distortion introduced by at least the analog signal processing circuitry.

* * * * *